United States Patent [19]

Sakano

[11] Patent Number: 5,444,543
[45] Date of Patent: Aug. 22, 1995

[54] METHOD AND APPARATUS FOR DETECTING A CLOSED-LOOP AREA OF AN IMAGE

[75] Inventor: Yukio Sakano, Fuchu, Japan

[73] Assignee: Ricoh Company, Ltd., Tokyo, Japan

[21] Appl. No.: 67,110

[22] Filed: May 26, 1993

[30] Foreign Application Priority Data

May 27, 1992 [JP] Japan .................................. 4-160200

[51] Int. Cl.[6] ............................................. H04N 1/21
[52] U.S. Cl. ................................................... 358/296
[58] Field of Search ............... 358/296, 300, 298, 302, 358/404, 451, 455, 447; 346/108, 107 R, 76 L, 1.1, 160

[56] References Cited

U.S. PATENT DOCUMENTS 4,912,487  3/1990  Porter et al. ..................... 346/108

Primary Examiner—Mark J. Reinhart
Attorney, Agent, or Firm—Popham, Haik, Schnobrich & Kaufman, Ltd.

[57] ABSTRACT

A closed-loop area detecting method includes the steps of: reading a dot matrix from bi-level image data, the dot matrix comprising a target dot and two or more contiguous dots contiguous to the target dot; performing a first pattern matching to detect whether a dot matrix coincides with one of a plurality of first patterns so as to set a first flag for each dot; performing a second pattern matching to detect whether a dot matrix coincides with one of a plurality of second patterns so as to set a second flag for each dot; repeating the above mentioned first and second flag setting so that the second flags for all the dots of the image data are set; and detecting a dot of the image data as lying in the inside of a closed-loop area when the second flag is set to a first value, and detecting a dot of the image data as lying on the outside of the closed-loop area when the second flag is set to a second value. An image processing apparatus utilizing the closed-loop area detecting method is also provided.

16 Claims, 38 Drawing Sheets (PM 1)

| 1 | X |
|---|---|
| 1 | X |

| O | 1 |
|---|---|
| 1 | X |

| O | O |
|---|---|
| 1 | 1 |

| O | O |
|---|---|
| 1 | O |

| 1 | X |
|---|---|
| O | 1 |

| 1 | X |
|---|---|
| O | O |

| O | X |
|---|---|
| O | 1 |

| X | O |
|---|---|
| X | X |

| O | X |
|---|---|
| O | O |

FIG.39J

| O | O |
|---|---|
| O | O |

FIG.44A  FIG.44B  FIG.44C
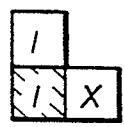 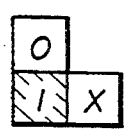 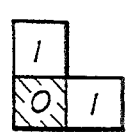
(PM 21)   (PM 22)   (PM 23)
FIG.44D  FIG.44E  FIG.44F
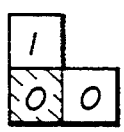 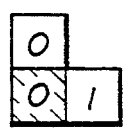 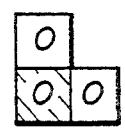
(PM 24)   (PM 25)

METHOD AND APPARATUS FOR DETECTING A CLOSED-LOOP AREA OF AN IMAGE

BACKGROUND OF THE INVENTION

The present invention relates to an image processing method and apparatus for detecting a closed-loop area of an image on a document and for generating a paint signal and an area detection signal based on the area detection result, to print a copy in which the inside of the closed-loop area is painted. The image processing method and apparatus are applied to digital copiers, facsimile machines, image scanners, and the like.

With recent development of image processing technology, an image processing system applied to digital copiers or facsimile machines and capable of editing an image, as well as capable of copying, receiving or transmitting the image has been proposed. One of image editing functions of the image processing system is to trim or paint the inside of a closed-loop area indicated by a special mark on a document.

The closed-loop area to be trimmed or painted is indicated by a special color mark which is manually drawn on a document using a color pen. In order to achieve the trimming function mentioned above, the image processing system must correctly detect the closed-loop area on the document. The optical density of the closed-loop area is assumed to fall within a given range. In the above mentioned system, it is necessary to generate an area detection signal indicating whether a dot of image data read from the document lies in the inside of the closed-loop area or on the outside thereof, so that the inside of the closed-loop area can be trimmed or painted in accordance with the area detection signal.

However, in a conventional image processing system, it is difficult to correctly detect whether a dot lies in the inside of a closed-loop area or on the outside thereof no matter what type of the closed-loop area is present on a document. For example, when a certain type of a closed-loop mark shown in FIG. 1A is present on a document, the above mentioned system erroneously detects dots on the outside of the mark as lying in the inside of a closed-loop area. In other words, the system detects dots in an area indicated by a letter "E" in FIG. 1A as lying a concealed portion of the closed-loop mark, even if the dots in the indicated area are processed in any of three directions indicated by arrows "A", "B" and "C" in FIG. 1A.

In another case where a double closed-loop mark having an external mark "MARK-1" and an internal mark "MARK-2" shown in FIG. 1B is present on a document, it is likely that the internal mark "MARK-2" in the double closed-loop mark will be disregarded. As a result, in the conventional system, dots in an area indicated by a letter "E" in FIG. 1B are detected as lying in the inside of a closed-loop area. The dots in the area "E" are not detected as lying on the outside of the internal mark "MARK-2" and in the inside of the external mark "MARK-1". Since a paint signal is generated in accordance with a detection signal for each of the erroreously detected dots, a copy in which the entire area in the inside of the double closed-loop mark is painted is produced. Thus, it is difficult for the conventional system to correctly perform the trimming or painting function no matter what type of a closed-loop area is present on a document.

SUMMARY OF THE INVENTION

Accordingly, it is a general object of the present invention to provide improved closed-loop area detecting method and apparatus in which the above described problems are eliminated.

Another, more specific object of the present invention is to provide a closed-loop area detecting method which correctly and reliably detects a closed-loop area on a document so that a paint signal and an area detection signal are generated based on the area detection result in order to print a copy in which the inside of the closed-loop area is painted.

The above mentioned objects of the present invention are achieved by a method which comprises steps of: reading a dot matrix from dots of bi-level image data sequentially for dots on a line in the image data in a first direction opposite to a reading direction, the dot matrix comprising a target dot and two or more previously read dots contiguous to the target dot and arranged in a first formation; performing a first pattern matching in which the dot matrix is compared with any of two or more first patterns, the first pattern matching being performed sequentially for the dots on the line in the first direction; setting a first flag for the target dot to a first value or a second value depending on whether the dot matrix coincides with any of the first patterns so that the first flags for the dots on the line are set; reading a dot matrix from dots of the bi-level image data sequentially for the dots on the line in the reading direction opposite the first direction, the dot matrix comprising the target dot and two or more previously-read contiguous dots and arranged in a second formation; performing a second pattern matching in which the dot matrix is compared with any of two or more second patterns, the second pattern matching being performed sequentially for the dots on the line in the reading direction; setting a second flag for the target dot to a first value or a second value depending on whether the dot matrix coincides with any of the second patterns and on the values of the first flags set in the step of setting the first flag, so that the second flags for the dots on the line are set; repeating the above mentioned steps until the second flags for all the dots of the bi-level image data are set; and detecting the target dot as lying in the inside of a closed-loop area when the second flag is set to the first value, and detecting the target dot as lying on the outside of the closed-loop area when the second flag is set to the second value. In this method, the second flag for the target dot is set to the first value or the second value in accordance with the value of the second flag previously set for one of the contiguous dots and in accordance with the image data for the target dot.

Still another object of the present invention to provide a simple, efficient image processing apparatus utilizing the above mentioned method which apparatus correctly and reliably detects a closed-loop area on a document and outputs a copy in which the inside of the closed-loop area is painted.

The above mentioned objects of the present invention are achieved by an image processing apparatus which includes: a first reading unit for reading a dot matrix from dots of bi-level image data sequentially for dots on a line in the image data in a first direction opposite to a reading direction, the dot matrix comprising a target dot and two or more previously read dots contiguous to the target dot and arranged in a first formation; a first pattern matching unit for performing a first pattern matching in which the dot matrix read by the first reading unit is compared with any of two or more first patterns, the first pattern matching being performed sequentially for the dots on the line in the first direction; a first flag unit for setting a first flag for the target dot to a first value or a second value depending on whether the dot matrix coincides with any of the first patterns so that the values of the first flags for the dots on the line are output; a second reading unit for reading a dot matrix from dots of the bi-level image data sequentially for the dots on the line in the reading direction opposite to the first direction, the dot matrix comprising a target dot and two or more previously-read contiguous dots and arranged in a second formation; a second pattern unit performing a second pattern matching in which the dot matrix read by the second reading unit is compared with any of two or more second patterns, the second pattern matching being performed sequentially for the dots on the line in the reading direction; a second flag unit for setting a second flag for the target dot to the first value or the second value depending on whether the dot matrix coincides with any of the second patterns and on the previously set values of the first flags so that the values of the second flags for the dots on the line are output, and the first flag setting and the second flag setting being repeated so that the second flags for all the dots of the bi-level image data are set; and an output unit for detecting whether a dot lies in the inside of the closed-loop area or on the outside thereof in accordance with the value of the second flag set by the second flag unit for the dot, and for outputting a detection signal and a paint signal in accordance with the second flag value and the image data for the dot.

According to the present invention, it is possible to correctly and reliably detect whether a dot of the image data lies in the inside of a closed-loop area or on the outside thereof based on the value of the second flag. Also, it is possible for the present invention to generate an area detection signal and a paint signal based on the second flag data and the image data for each dot of the image data. In addition, it is possible for the recording unit to print a copy in which the inside of the closed-loop area is painted in accordance with the paint signal and the area detection signal.

Other objects and further features of the present invention will be apparent from the following detailed description when read in conjunction with the accompanying drawings.

BRIEF DESCRIPTION OF THE DRAWINGS

FIGS. 39A through 39J are diagrams showing patterns in pattern matching steps of the first flag setting process shown in FIG. 38;

FIGS. 41A through 41D are diagrams showing patterns in pattern matching steps of the second flag setting process shown in FIG. 40;

FIG. 42 is a diagram showing bi-level image data which is derived from input image data of a closed-loop image read from a document;

FIGS. 44A through 44f are diagrams showing patterns in pattern matching steps of the first flag setting process shown in FIG. 43;

FIGS. 47 through 49 are diagrams for explaining the resulting data after the first and second flag setting processes are performed for the image data shown in FIG. 42;

DESCRIPTION OF THE PREFERRED EMBODIMENTS

Herein, a description will be given of each of several preferred embodiments of the present invention with reference to the accompanying drawings.

FIRST EMBODIMENT

A description will be given of a closed-loop area detecting method and apparatus provided by a first embodiment of the present invention with reference to FIGS. 2 through 20B.

1. Construction of Digital Copier

First, the construction of a digital copier to which each of several preferred embodiments of the image processing method and apparatus according to the present invention is applied will be explained.

Figure 1A:
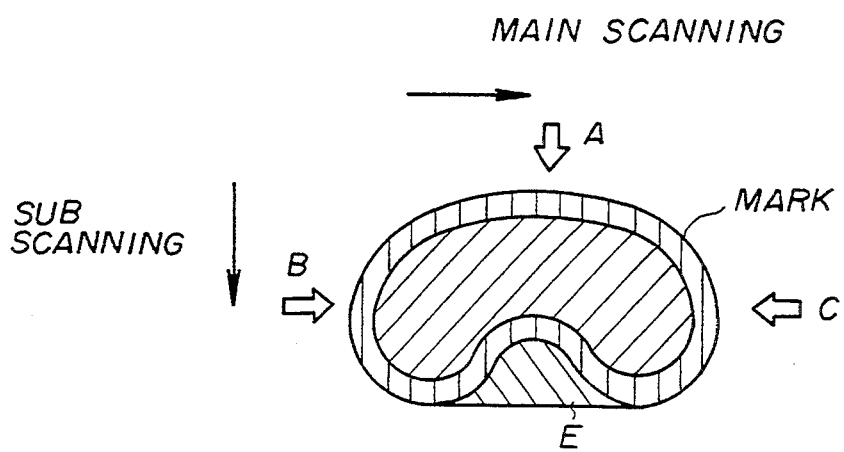
FIGS. 1A and 1B are diagrams showing examples of closed-loop marks which are incorrectly detected by a conventional image processing system.
Figure 1B:
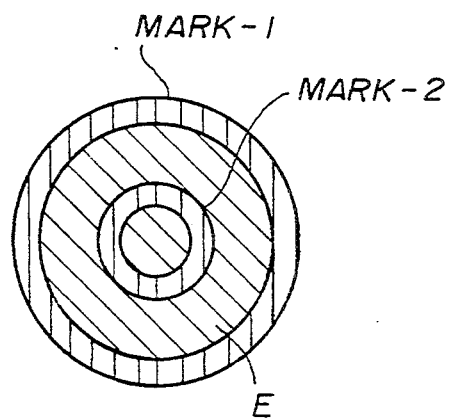
Figure 2:
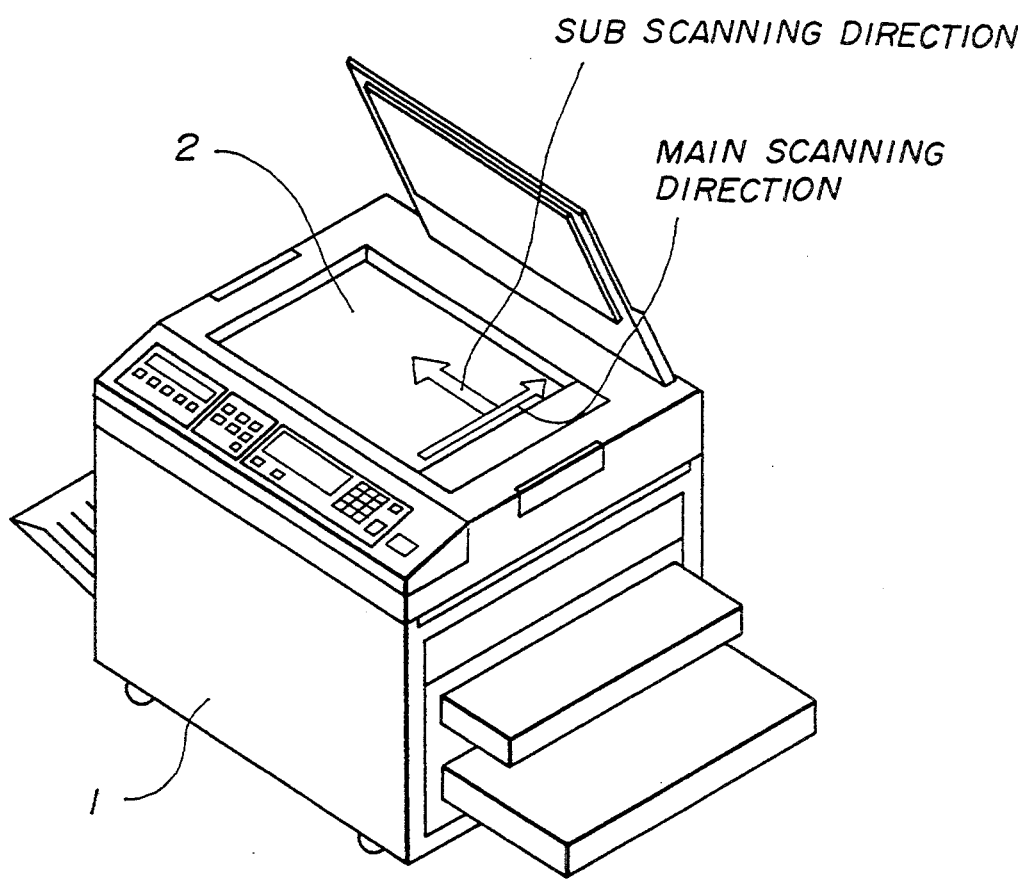
FIG. 2 is a perspective view showing a digital copier to which a preferred embodiment of the image processing apparatus according to the present invention is applied.

FIG. 2 shows a digital copier 1 to which the present invention is applied. A document (not shown) placed on a contact glass 2 of the digital copier 1 is optically scanned by a CCD (charge coupled device) line sensor (not shown) to generate an optical signal. The optical signal is photoelectrically converted into a digital image data, and the digital image data is stored as input image data. The input image data is made up of a set of dots at a 400-dpi (400 dots per inch) resolution. As shown in FIG. 2, a main scanning is made over a document by the line sensor along the longitudinal line thereof, and a sub-scanning is made by movement of the line sensor relative to the document in a direction perpendicular to the main scanning direction.

Figure 3:
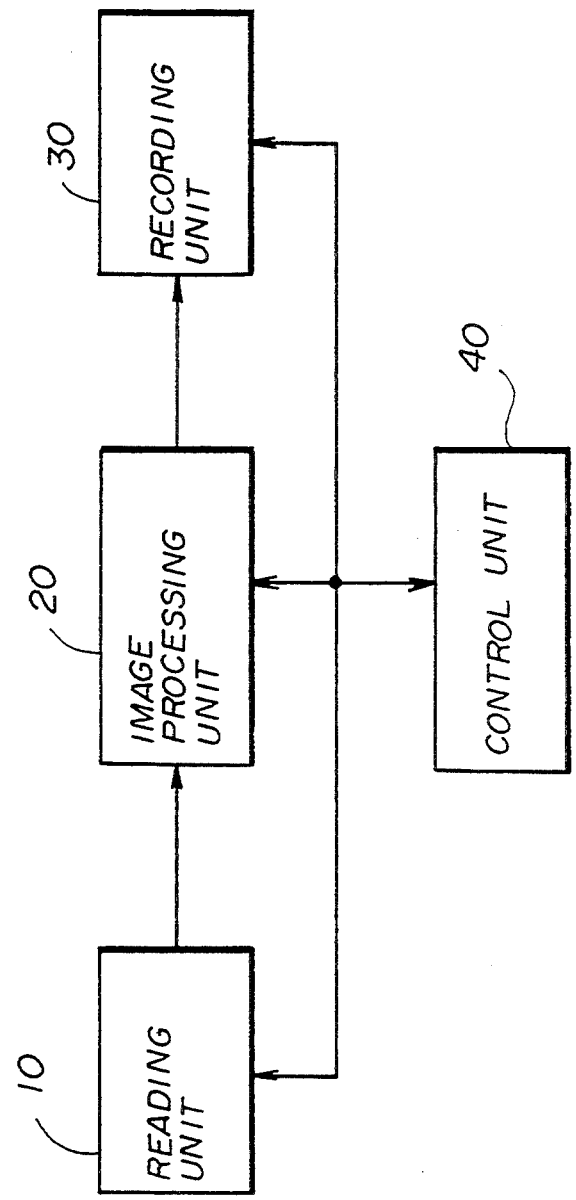
FIG. 3 is a block diagram showing the construction of the digital copier shown in FIG. 2.

FIG. 3 shows the construction of the digital copier shown in FIG. 2. As shown in FIG. 3, the digital copier generally has a reading unit 10, an image processing unit 20, a recording unit 30, and a control unit 40. The reading unit 10 optically reads an optical signal from an original image of a document. The optical signal is amplified by an amplifier (not shown), and the amplified signal is photoelectrically converted into digital image data by an A/D (analog-to-digital) converter (not shown). This digital image data is stored in an image storage memory (not shown) as input image data, and the image data is supplied from the recording unit 10 to the image processing unit 20. The image data supplied to the image processing unit 20 is made up of a set of 6-bit multilevel data, and the gradation value (also called the halftone level or the gray level) of the multilevel data per pixel ranges from 0 to 63.

The image processing unit 20 can perform several image processing procedures for the image data supplied from the reading unit 10. The image processing procedures include a black/white dot transformation, a shading correction, an MTF (modulation transfer function) correction, and a closed-loop area detection according to the present invention. Image data after all the image processing procedures are performed is supplied from the image processing unit 20 to the recording unit 30.

Figure 4A:
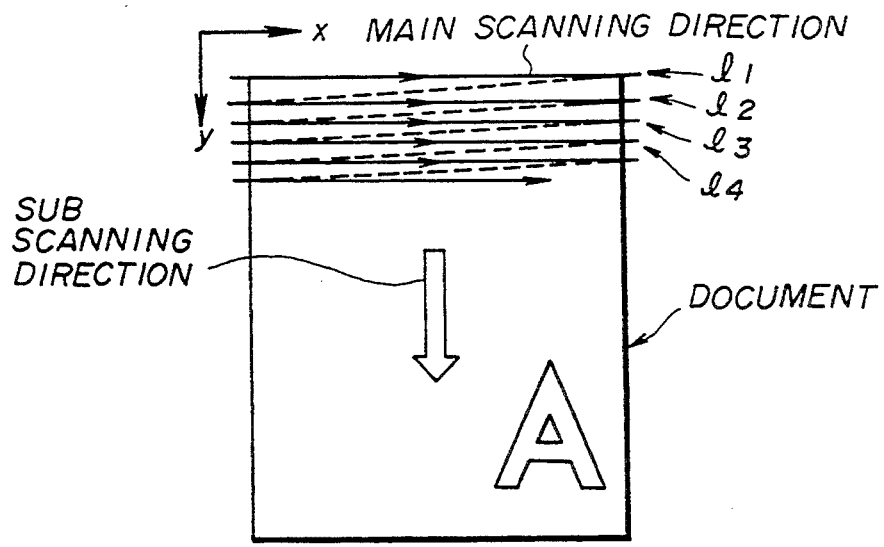
FIGS. 4A and 4B are diagrams showing a document on which a hollow, closed-loop area is present and a copy printed after an image processing method of the present invention is carried out.

The recording unit 30 is a laser beam printer utilizing a known electrophotographic printing technique. The recording unit 30 receives the image data from the image processing unit 20 and prints a copy in which the image data is reproduced at a 400-dpi resolution. The control unit 40 controls operations of the reading unit 10, the image processing unit 20, and the recording unit 30. FIG. 4A shows a document read by the reading unit 10 of the digital copier. A hollow, closed-loop area (the character "A") is present on the document shown in FIG. 4A. In this drawing, a relationship between the document and the scanning directions of the reading unit 10 is indicated, and "x" denotes the main scanning direction and "y" denotes the sub scanning direction. This notation is used hereinafter to indicate the main and sub scanning directions Also, in FIG. 4A, "11", "12", "13", etc respectively denote scanning lines, and an original image is scanned by the reading unit 10 along a scanning line over the document each time the main scanning is made in conjunction with the sub scanning.

By performing the closed-loop area detecting method according to the present invention, any closed-loop area on the original image is correctly detected by the image processing unit 20. A paint signal and a detection signal are generated from the result of the area detection, in order to paint out the inside of the closed-loop area.

Figure 4B:
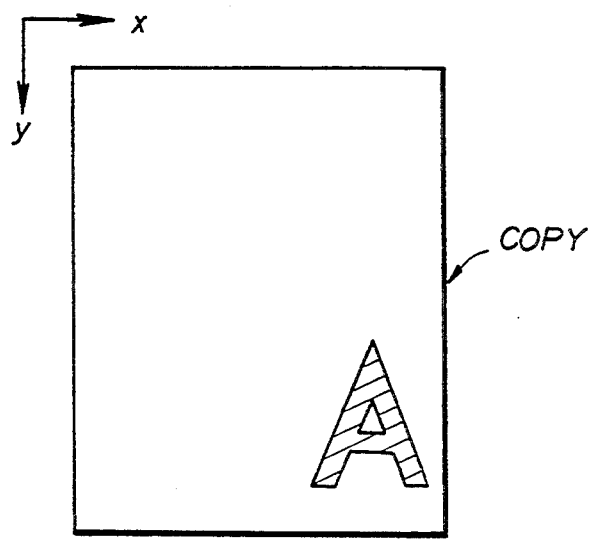

FIG. 4B shows a copy printed by the recording unit 30 after the closed-loop area detecting method is carried out for the input image data derived from the original image. In this copy, the inside of the closed-loop area (which area is enclosed by the outlines of the character "A") is painted in accordance with the paint signal and the area detection signal.

Figure 5:
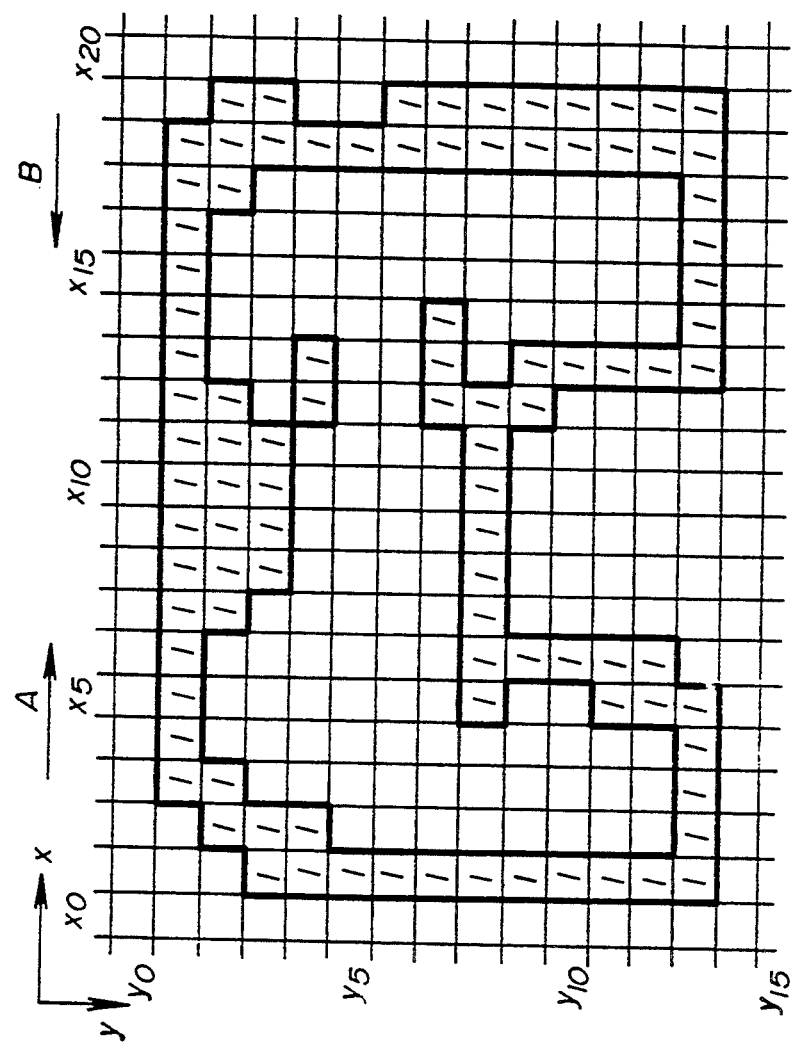
FIG. 5 is a diagram showing bi-level image data which is derived from input image data read from a document on which a closed-loop area is present.

FIG. 5 shows bi-level image data which is derived from input image data read from a document on which a closed-loop area is present. A dot of the bi-level image data (a dot from among 20×15 dots shown in FIG. 5) is obtained based on the multilevel data of the digital image data supplied from the reading unit 10. This is carried out through a known binarization. When a gradation value of multilevel data for a dot of the input image is greater than a given threshold value, the bi-level image data for the dot is set to 1 (i.e., a black dot). Conversely, when a gradation value for another dot is smaller than the threshold value, the bi-level image data for the dot is set to 0 (i.e., a white dot). The bi-level image data is thus made up of a set of black and white dots (in the accompanying drawings, picture elements of an image or dots of image data are respectively indicated by small square sections enclosed by vertical and horizontal lines). In FIG. 5, however, only black dots are indicated by the numeral "1" and the indication of white dots by the numeral "0" is omitted, in order to clearly show a closed-loop area.

A set of black and white dots arranged on a scanning line is obtained when the document is scanned on a scanning line in the main scanning direction (in a direction indicated by an arrow "A" in FIG. 5). The dots of the image data on one scanning line are sequentially read in the direction "A" (i.e, from the left to the right). After one main scanning is made, the document is scanned on another scanning line below and contiguous to the previous scanning line (i.e., shifted from the top to the bottom in the sub scanning direction "y"), so that another set of black and white dots arranged on such a lower, contiguous line is obtained. This procedure is repeated until the scanning of the document is finished for all the dots of the image data.

2. Closed-Loop Area Detecting Method

Next, a description will be given of the closed-loop area detecting method according to the present invention which is performed in a case in which the bi-level image data shown in FIG. 5 read from a document is processed. According to this method, it is detected whether a dot of the image data lies in the inside of a closed-loop area or on the outside thereof. A paint signal and a detection signal are generated from the result of the area detection, so that a copy is printed in which the inside of the closed-loop area is painted.

Figure 6:
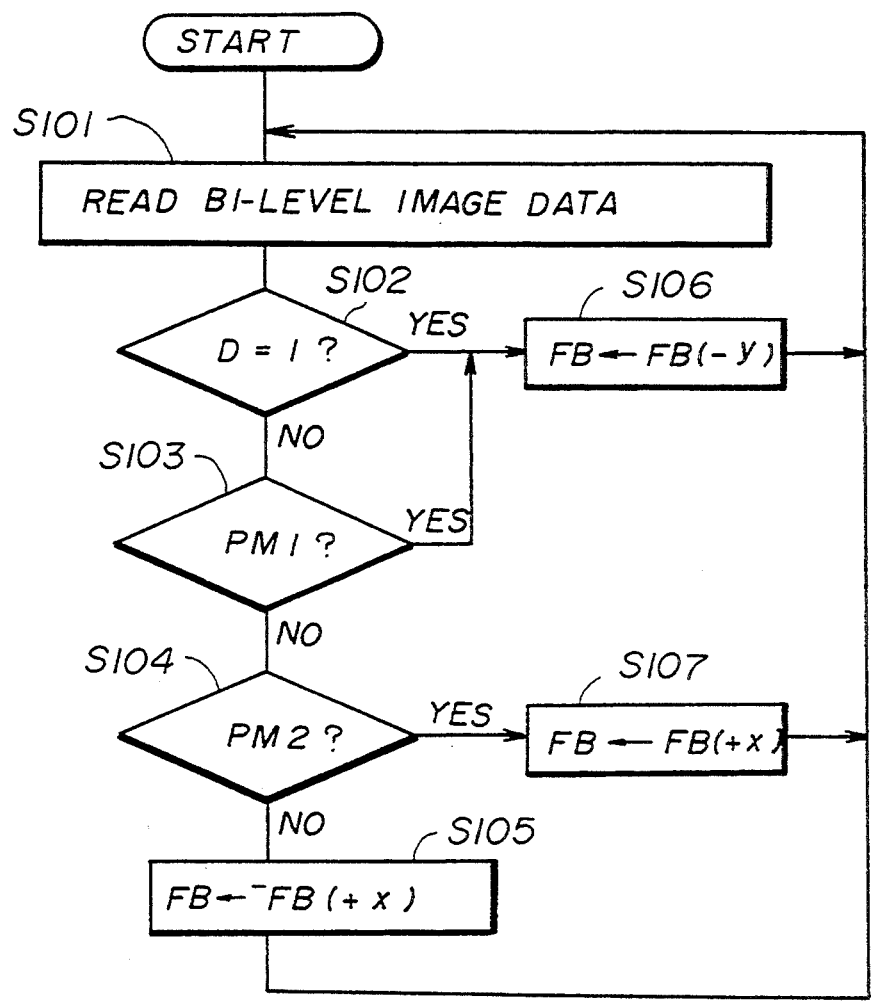
FIG. 6 is a flowchart for explaining a first flag setting process performed by a first embodiment of the image processing unit according to the present invention.

FIG. 6 shows a first flag setting process in which a first flag indicating whether a dot of the input image lies in the inside of a closed-loop area or on the outside thereof is temporarily set. This first flag is set for each dot.

Before the first flag setting process is performed, the first flags for the respective dots of the image data are set to "0". If a dot is detected as being in the inside of a closed-loop area, the first flag for the dot is set to "1". If another dot is detected as being on the outside of a closed-loop area, the first flag for the dot is set to "0". Hereinafter, the first flag is indicated by the letter "FB". For the sake of explanation, it is assumed that, when the first flag setting process for dots of image data arranged on a current line is performed, the first flags for dots of image data arranged on previous lines (located above the current line) are already set, and the first flags for the dots on the previous lines and the image data thereof are already known.

In step S101 of the first flag setting process shown in FIG. 6, the bi-level image data D is read for each dot. A set of dots of the image data arranged on a line is sequentially read in the direction "B" opposite to the main scanning direction "A" in FIG. 5, for the sake of building a simple, efficient image processing circuit. For example, after image data D for a dot at (x15, y1) is read, image data D for the left-hand contiguous dot at (x14, y1) is read.

In step S102, it is detected whether or not the image data D is equal to 1. If the answer to step S102 is affirmative, step S106 is performed. If the answer to step S102 is negative, step S103 is performed. Step S106 sets the previous first flag previously set for the upper contiguous dot (another dot contiguous to the target dot and on a previous line above the current line) to the first flag FB for the target dot. Hereinafter, the previous first flag previously set for the upper contiguous dot is indicated as "FB(−y)". For example, when the first flag FB for a dot at (x15, y2) is currently being set, the previous first flag FB(−y) indicates a value of the previous first flag previously set for the upper contiguous dot at (x15, y1). Initially, the previous first flag FB(−y) for such a dot is set to 0.

Figure 7A:
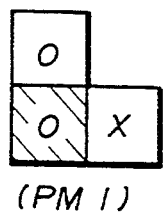
FIGS. 7A, 7B and 7C are diagrams showing patterns in pattern matching steps of the first flag setting process.

Step S103 performs a pattern matching in which a dot matrix of the image data is compared with a pattern PM1 shown in FIG. 7A. The dot matrix to be compared with the pattern is made up of three dots of the image data: the target dot, the upper contiguous dot, and the right-hand contiguous dot.

Figure 7B:
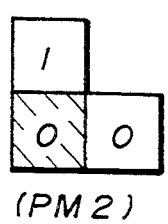
Figure 7C:
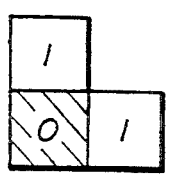

In FIGS. 7A through 7C, a shaded square section indicates the target dot for which a first flag is currently being set, the numeral "1" or "0" within a square section indicates the value of bi-level image data for a dot, and the sign "x" within a square section indicates that both the values "0" and "1" of bi-level image data are permissible for a dot. Hereinafter, the same notation is used in the other drawings.

If the dot matrix coincides with the pattern PM1 in step S103, the above step S106 is performed. If the dot matrix does not coincide, step S104 is performed. Step S104 performs a pattern matching in which the dot matrix is compared with a pattern PM2 shown in FIG. 7B.

If the dot matrix coincides with the pattern PM2 in step S104, step S107 sets the previously set first flag for the right-hand contiguous dot (i.e., a dot contiguous to the target dot and located to the right of the target dot on the current line in the image data) to the first flag FB for the target dot. Hereinafter, the previously set first flag for the right-hand contiguous dot is indicated as "FB(+x)". Initially, the first flag FB(+x) is set to 0.

If the coincidence does not occur in step S104, step S105 sets the inverted value of the previously set first flag for the right-hand contiguous dot to the first flag FB for the target dot. Hereinafter, the inverted value of the previously set first flag for the right-hand contiguous dot is indicated as "−FB(+x)". In a case where a dot matrix does not coincide with both the patterns PM1 and PM2, the dot matrix coincides with a pattern shown in FIG. 7C.

After the setting of first flags for a set of dots of the bi-level image data arranged on a line is completed, the first flag setting process for a set of dots of the bi-level image data arranged on another line below the previous line is performed. Therefore, the first flag setting process described above is repeated until the setting of first flags for all the dots of the image data on all the scanning lines is completed.

Figure 8:
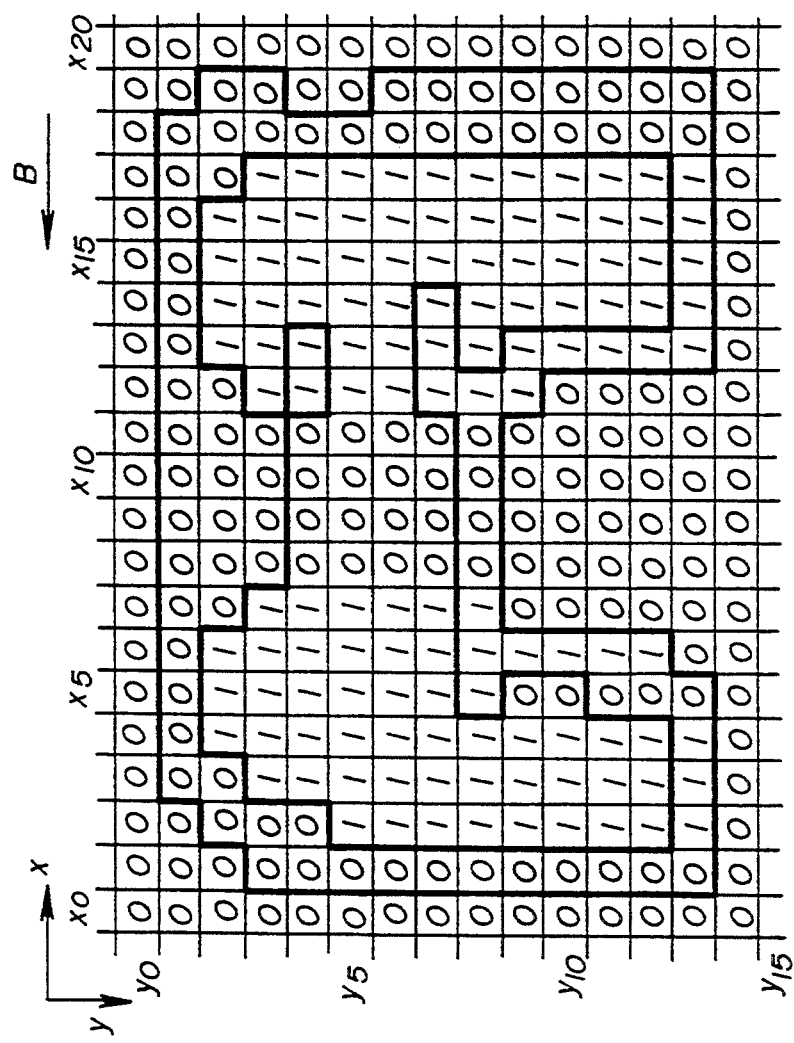
FIG. 8 is a diagram showing resulting data of first flags for the respective dots of the image data shown in FIG. 5 after the first flag setting process is performed.

FIG. 8 shows the resulting data of the first flags FB for the respective dots of the image data shown in FIG. 5 after the first flag setting process shown in FIG. 6 is performed. For example, at (x18, y1), the image data D for the dot is detected to be equal to 1, and the first flag FB(−y) for the upper contiguous dot at (x18, y0) is equal to 0. Therefore, the first flag FB at (x18, y1) is set to 0 (step S106; FB←−FB(−y)=0).

At (x16, y2), the dot matrix does not coincide with both the pattern PM1 shown in FIG. 7A and the pattern PM2 shown in FIG. 7B. The inverted value of the first flag FB(+x) for the right-hand contiguous dot at (x17, y2) is equal to 1. Therefore, the first flag FB at (x16, y2) is set to 0 (step S105; FB ←−$^1$FB(+x)=1).

Figure 9:
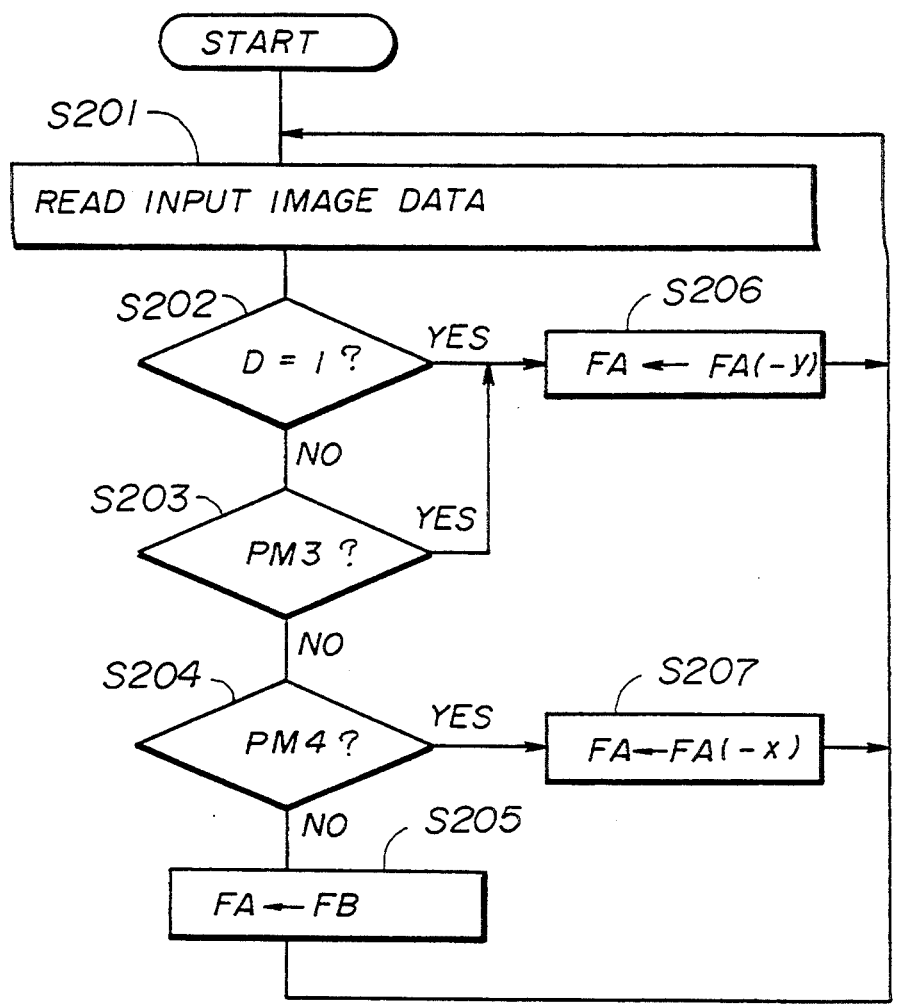
FIG. 9 is a flowchart for explaining a second flag setting process provided by the first embodiment of the present invention.

FIG. 9 shows a second flag setting process in which a second flag "FA" indicating whether a dot of the input image lies in the inside of a closed-loop area or on the outside thereof is set after all the first flags "FB" were set through the first flag setting process. Similarly to the first flag, the second flag is set for each pixel of a copy image.

Before the second flag setting process is performed, the second flags for the respective dots of the input image are initially set to "0". If a dot is detected as being in the inside of a closed-loop area, the second flag for the dot is finally set to "1". If another dot is detected as being on the outside of a closed-loop area, the second flag for the dot is finally set to "0". For the sake of explanation, it is assumed that, before the second flag setting process for dots of input image data arranged on a current line is performed, the first flags for dots of the input image data arranged on previous lines are previously set and the second flags for the dots of the input image arranged on the previous lines are previously set, and the respective values of the first and second flags are previously determined.

In step S201 of the process shown in FIG. 9, the bi-level image data D for each dot of the input image is read. A set of dots of bi-level image data arranged on a line is sequentially read in the main scanning direction "A" in FIG. 5 (which direction is opposite to the direction "B" with respect to the first flag setting process), for the sake of building a simple, efficient image processing circuit. For example, after the image data D for a dot at (x15, y1) is read, the image data D for a right-hand dot at (x16, y1) is read. In synchronism with the reading of the image data D, a known value of the first flag "FB" for the dot is read, and the first flag value is used to set the second flag "FA".

In step S202, it is detected whether or not the image data D is equal to 1. If the answer to step S202 is affirmative, step S206 is performed. If the answer to step S202 is negative, step S203 is performed. Step S206 sets the previous second flag previously set for the upper contiguous dot (another dot contiguous to the target dot and on an upper line above the current line) to the second flag FA for the target dot. Hereinafter, the previous second flag for the upper contiguous dot is indicated as "FA(−y)". Initially, the previous second flag FA(−y) for such a dot is set to 0.

Figure 10A:
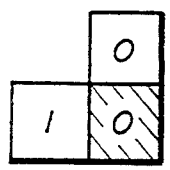
FIGS. 10A, 10B and 10C are diagrams showing patterns in pattern matching steps of the second flag setting process.

Step S203 performs a pattern matching in which a dot matrix of the image data is compared with a pattern PM3 shown in FIG. 10A. This dot matrix is made up of the target dot, the left-hand contiguous dot, and the upper contiguous dot. If the dot matrix coincides with the pattern PM3, the above step S206 is performed. If the coincidence does not occur, step S204 is performed.

Figure 10B:
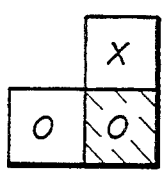
Figure 10C:
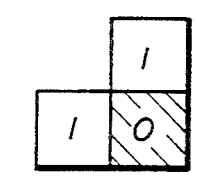

Step S204 performs a pattern matching in which the dot matrix is compared with a pattern PM4 shown in FIG. 10B. If the dot matrix coincides with the pattern PM4, step S207 sets the previous second flag previously set for the left-hand contiguous dot (i.e., a dot contiguous to the target dot and located to the left of the target dot on the current line) to the second flag FA for the target dot. Hereinafter, the previous second flag previously set for the left-hand contiguous dot is indicated as "FB(−x)". Initially, the previous second flag "FB(−x)" is set to 0.

If the coincidence does not occur in step S204, step S205 sets the previous first flag FB for the target dot to the second flag FA. In a case where the dot pattern does not coincide with both the patterns PM3 and PM4, the dot matrix coincides with a pattern shown in FIG. 10C.

After the setting of second flags for a set of dots of the bi-level image data arranged on a line is completed, the second flag setting process for another set of dots of the bi-level image data arranged on another line below the previous line is performed. The above mentioned procedure is repeated until the setting of second flags for all the dots of the bi-level image data is completed.

Figure 11:
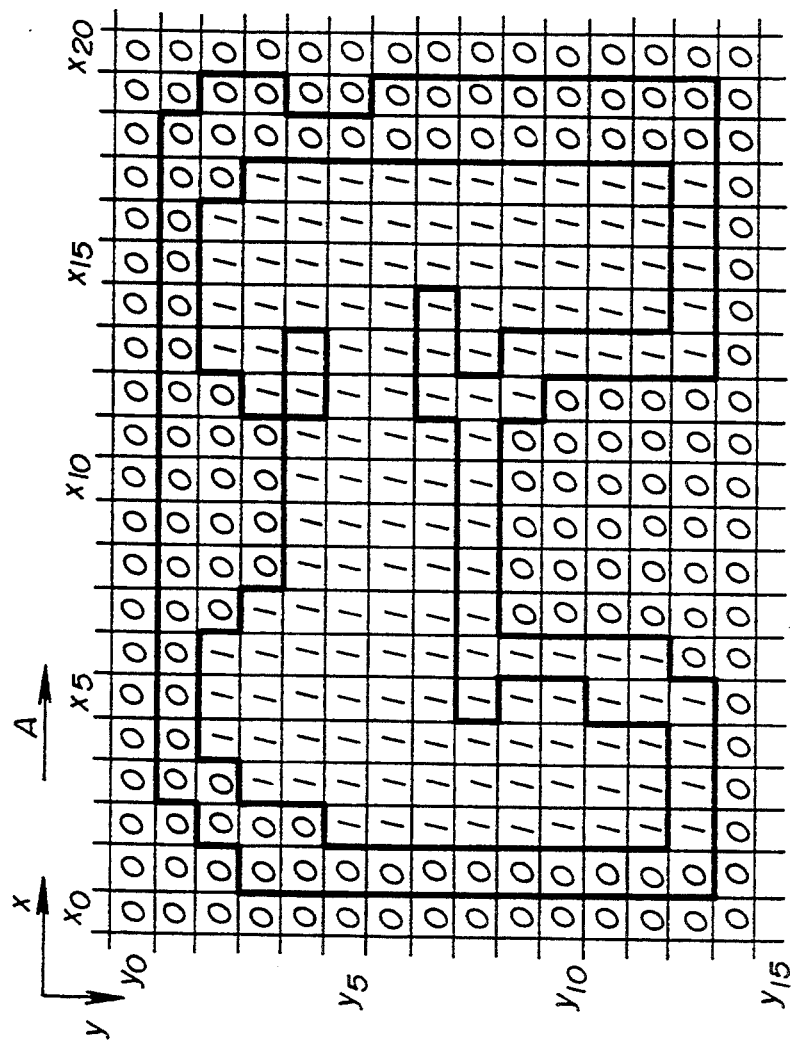
FIG. 11 is a diagram showing resulting data of second flags for the respective dots of the image data shown in FIG. 5 after the second flag setting process is performed.

FIG. 11 shows the resulting data of the second flags FA for the respective dots of the image data shown in FIG. 5 after the second flag setting process shown in FIG. 9 is performed for all the dots of the image data. For example, at (x3, y2), the image data for the dot is detected to be equal to 1, and the previous second flag FA(−y) for the upper contiguous dot at (x3, y1) is set to the second flag FA at (x3, y2). The previous second flag FA(−y) for the dot at (x3, y1) is equal to 0. Therefore, the second flag FA at (x3, y2) is set to 0 (step S206; FA ←−FA(−y)=0).

At (x4, y2), the dot matrix does not coincide with both the patterns PM3 and PM4 shown in FIGS. 10A and 10B. The previous first flag FB for the dot at (x4, y2) is equal to 1. Therefore, the second flag FA at (x4, y2) is set to 1 (step S205; FA←−FB=1).

At (x8, y4), the dot matrix coincides with the pattern PM4 shown in FIG. 10B. The previous second flag FA(−x) at (x7, y4) is equal to 1. Therefore, the second flag FA at (x8, y4) is set to 1 (step S207; FA ←−FA(−x)=1).

As shown in FIG. 11, when a dot of the image data lies in the inside of the closed-loop area, the second flag FA for the dot is set to 1. When another dot of the image data lies on the outside of the closed-loop area, the second flag FA for the dot is set to 0. Each dot of the bi-level image data D being input is indicated as either the value one or the value zero as shown in FIG. 5. Therefore, according to the present invention, an area detection signal and a paint signal can be generated by performing a simple logic operation between the second flag FA and the image data D. An area detection signal is obtained by performing FA*−D operation, and this signal indicates whether a dot of the image data lies in the inside of the closed-loop area on the document. A paint signal is obtained by performing (FA+D) operation (an operator "+" denotes OR operation), and this signal is used to paint out the inside of the closed-loop area on a copy.

Figure 12:
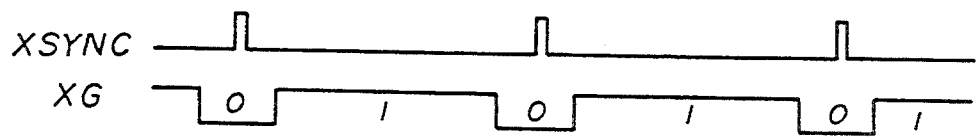
FIG. 12 is a timing chart for explaining a gate signal indicating an effective scanning period associated with a scanning line sync signal.
Figure 13:
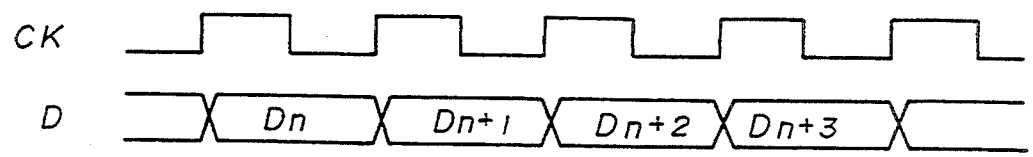
FIG. 13 is a timing chart for explaining a data signal indicating a bi-level image data associated with a main scanning clock.

FIGS. 12 and 13 are timing charts of signals associated with the image data. FIG. 12 shows a gate signal XG indicating an effective scanning period associated with a main scanning line sync signal XSYNC. A leading edge of the gate signal XG where the value of the gate signal changes from 0 to 1) corresponds to a left-hand edge (or, a start of main scanning) of a scanning line of the document shown in FIG. 4A, and a trailing edge of the gate signal XG where the value thereof changes from 1 to 0 corresponds to a right-hand edge (or, an end of main scanning) of the scanning line of the document. A time period when XG=1 corresponds to a time period for which image data is effective in the main scanning direction. FIG. 13 shows a data signal D indicating a value of bi-level image data associated with a main scanning clock CK. The main scanning clock CK is a sync signal indicating the timing of a pixel being present in the main scanning direction.

3. Construction of Image Processing Unit

Figure 14:
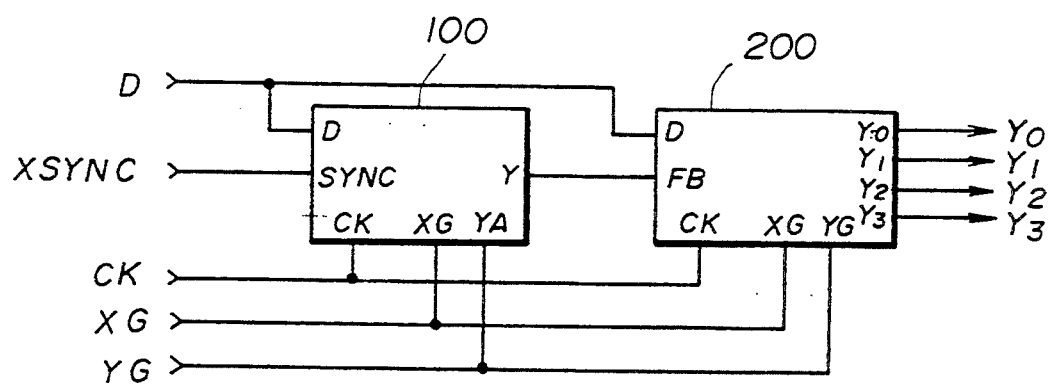
FIG. 14 is a block diagram showing the first embodiment of the image processing unit which performs both the first flag setting process and the second flag setting process.

Next, a description will be given of the construction of the image processing unit according to the present invention, which carries out the closed-loop area detecting method described above. FIG. 14 shows the image processing unit according to the present invention, and this image processing unit includes a first flag setting circuit 100 and a second flag setting circuit 200.

The first flag setting circuit 100 sets the first flag FB for each dot of the input image data, and an output Y of the circuit 100 is the value of the first flag FB (i.e., Y=FB). The second flag setting circuit 200 sets the second flag FA for each dot of the input image data, and an output Y1 of the circuit 200 is the value of the second flag FA (i.e., Y1=FA). An output Y0 of the circuit 200 is the value of the image data D, an output Y2 thereof is the value of the paint signal (FA+D), and an output Y3 thereof is the value of the area detection signal (FA*−D) ("+" denotes "OR" operation, "*" denotes "AND" operation, and "D" denotes the inverted value of the image data D.

The signals D, XSYNC, CK and XG shown in FIG. 14 are the same as those shown in FIGS. 12 and 13. A signal YG indicates an effective scanning period with respect to the sub scanning direction. A time period when YG=1 corresponds to a time period for which image data is effective in the sub scanning direction. These signals are input to each of the first and second flag setting circuits 100 and 200.

Figure 15:
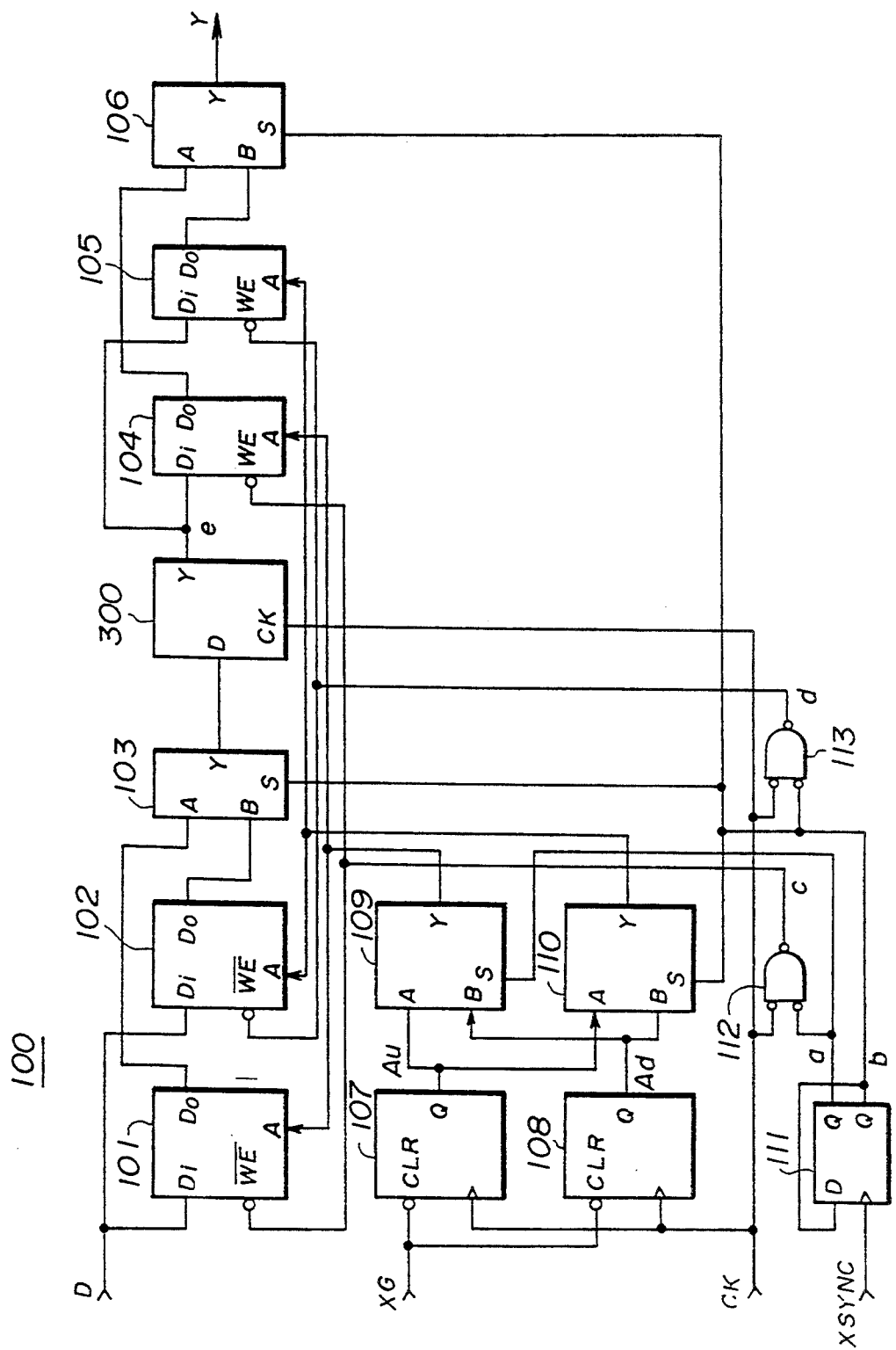
FIG. 15 is a system diagram showing a first flag setting circuit of the first embodiment.

FIG. 15 shows the construction of the first flag setting circuit 100. This circuit 100 includes four random access memories (RAM) 101, 102, 104 and 105. Each of the four RAMs has an input terminal Di, an output terminal Do, an address terminal A, and a write enable terminal WE. The circuit 100 also includes four selectors 103, 106, 109 and 110. Each of the four selectors has two input terminals A and B, a select signal terminal S and an output terminal Y. When a select signal indicating the value zero is input to the terminal S of one selector, data input to the input terminal A of the selector is selected and the data is output from the terminal Y. When a select signal indicating the value one is input to the terminal S of one selector, data input to the terminal B of the selector is selected and the data is output from the terminal Y.

In the first flag setting circuit 100 shown in FIG. 15, an up counter 107 and a down counter 108 are provided. When the signal XG is equal to 1, the up counter 107 counts up clock pulses of the clock CK. The count value of the up counter 107 increases from the initial value "0" to the maximum value M. The count value of the counter 107 corresponds to the location of a dot of image data on a scanning line (or, the address of a pixel in the main scanning direction), and the maximum value M corresponds to the right-hand edge of the scanning line. When the signal XG is equal to 1, the down counter 108 counts down clock pulses of the clock CK. The count value of the down counter 108 decreases from the initial value "M" to zero, and the count value of the counter 108 corresponds to the address of a pixel in the direction opposite to the main scanning direction. An address signal Au indicating the count value of the up counter 107 and an address signal Ad indicating the count value of the down counter 108 are input to each of the selectors 109 and 110.

The circuit 100 further includes a D-type flip flop 111, two AND gates 112, 113, and a first flag detector 300. The first flag detector 300 supplies a signal indicating the value of the first flag FB determined through the pattern matching.

The operation performed by the first flag setting circuit 100 shown in FIG. 15 will be described. The D-type flip flop 111 outputs select signals "a" and "b" to the selectors 109 and 110, and the values of the two signals "a" and "b" are changed between 1 and 0 for each line such that the value of one signal is equal to the inverted value of the other. After the signal "a" indicating the value zero and the signal "b" indicating the value one for a line are input to the selectors 109 and 110, respectively, the signal "a" indicating the value one and the signal "b" indicating the value zero are input to the selectors 109 and 110, respectively, for another line following the previous line.

When the select signal "a" indicating the value zero (a=0) is input to the selector 109, the selector 109 outputs the address signal Au of the up counter 107 to each of the RAMs 101 and 104. A write enable signal "c" supplied from the AND gate 112 is input to each of the RAMs 101 and 104, so that the input image data D is written to each of the RAMs 101 and 104. At the same time, the select signal "b" indicating the value one (b=1) is input to the selector 110, and the selector 110 outputs the address signal Ad of the down counter 108 to each of the RAM 102 and the RAM 105. No write enable signal "d" is output by the AND gate 113 to each of the RAMs 102 and 105, and the previous input image data is read out from the RAMs 102 and 105.

In the processing of dots on a line in the image data for which the select signals: a=0, b=1 are input, the input image data is written to the RAMs 101, 104, and the address of the data (the count value) is increasing in the main scanning direction (or, the direction of the processing is "A" in FIG. 5). At the same time, the previous image data is read from the RAMs 102, 105 and the direction of the processing the address of the data is decreasing in the main scanning direction (or, the direction of the processing is "B" in FIG. 5). In the processing of another line of the image data for which the select signals: a=1, b=0 are input, the previous image data is read from the RAMs 101, 104 and the direction of the processing is "B" in FIG. 5. At the same time, the input image data is written to the RAMs 102, 105, and the direction of the processing is "A" in FIG. 5.

When a=0, the image data which was previously written in the processing of a previous line is supplied from the RAM 102 to the input data terminal B of the selector 103. This image data is sequentially read in the direction B opposite to the main scanning direction. When a=0, the select signal b=1 is input to the select signal terminal S of the selector 103, so that the image data of the RAM 102 is selected and output from the selector 103 to the first flag detector 300. The image data present at the terminal Y of the selector 103 is the bi-level image data on a previous line above the current line. This image data corresponds to the bi-level image data being read in step S101 of the process shown in FIG. 6.

In the first flag detector 300, the checking of the image data value, the pattern matching of the dot matrix with the pattern PM1, and the pattern matching of the dot matrix with the pattern PM2 in steps S102, S103 and S104 shown in FIG. 6 are carried out. The operation of the first flag detector 300 will be described below. The value of the first flag FB is determined, and a signal "e" indicating the value of the first flag FB is output from the terminal Y of the first flag detector 300 to each of the RAMs 104, 105.

The RAMs 104, 105 and the selector 106 perform the function which is the same as the function of the RAMs 101, 102 and the selector 103. The output signal of the selector 106 is delayed from the signal "e" supplied from the first flag detector 300 to the RAMs 104, 105, and the output signal of the selector 106 is delayed from the input image data D (input to the RAMs 101, 102) by two lines. Thus, the output of the selector 106 provides first flag data for a dot on a previous line located two lines higher than the current line. The output signals of the selector 106 are sequentially processed in the direction "B" shown in FIG. 5 as the signal "e" is supplied to the RAMs 104, 105 and the select signal b=1 is input to the selector 106 when a=0. The output signal Y of the first flag setting circuit 100 indicates the value of the first flag FB for a dot of the image data on a previous line located two lines higher than the current line.

Figure 16:
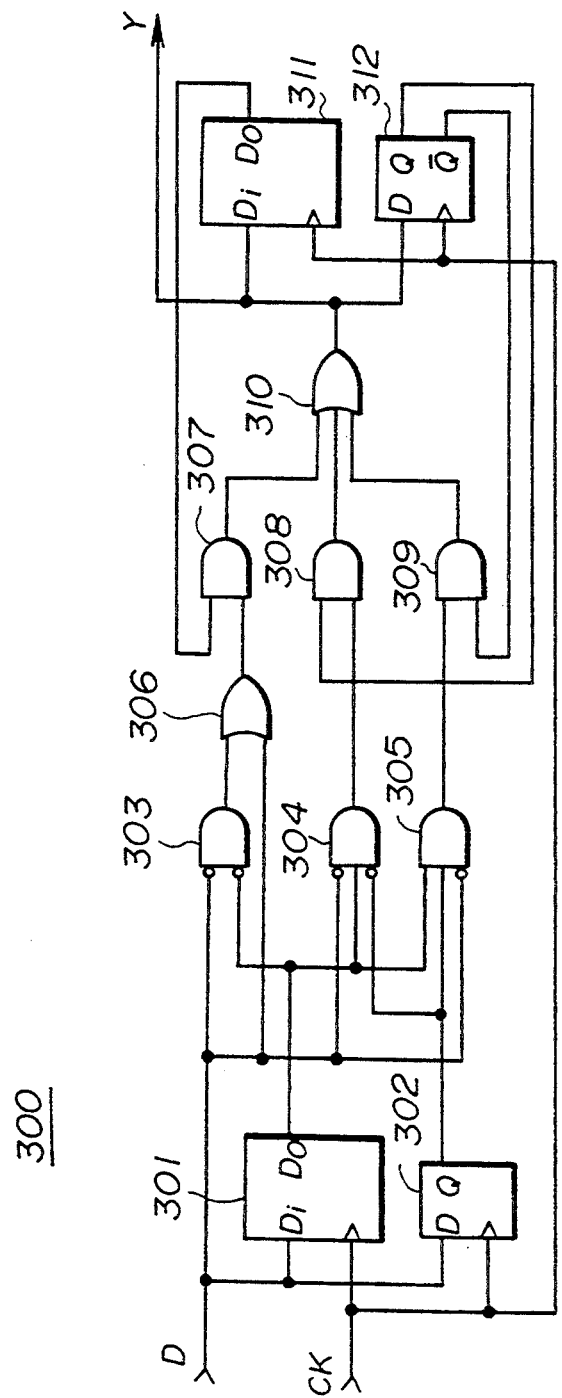
FIG. 16 is a system diagram showing a first flag detector of the first flag setting circuit.

FIG. 16 shows the construction of the first flag detector 300. The first flag detector 300 shown in FIG. 16 includes two FIFO (first-in, first-out) line memories 301 and 311 (for example, NEC uPD42505C). It is possible for the line memories 301 and 311 that input data Di is sequentially written to the memories in synchronism with the clock CK and the previous data is sequentially read from the memories in synchronism with the clock CK in the order that is the same as the order of writing the input data to the memories. In the first embodiment shown in FIG. 16, the line memories 301, 311 are used as a delay storage. The data Do output from each of the line memories 301, 311 delays from the input data Di by one line. The output data Do is read from each of the line memories 301, 311 in synchronism with the input data Di, and the sequence of reading of the output data Do is the same as the sequence of the input data Di. For example, when input data Di for a dot at (x5, y4) on a line y4 shown in FIG. 8 is input to the line memory 301, the output data Do for the upper contiguous dot at (x5, y3) on a previous line y3 is output from the line memory 301. For the sake of convenience, control signals (WCK, RCK, etc.) to be input to the line memories 301, 311 are omitted from the first flag detector shown in FIG. 16.

The first flag detector 300 shown in FIG. 16 also includes two D-type flip flops 302, 312, and eight logic gates 303-310. The operation performed by the first flag detector 300 shown in FIG. 16 will now be described in conjunction with the first flag setting process shown in FIG. 6. In this first flag detector 300, the bi-level image data D (input to the detector 300), the output Do (supplied from the line memory 301), and the output Q (supplied from the flip flop 302) respectively correspond to the target dot, the upper contiguous dot, and the right-hand contiguous dot. In the pattern matching, it is detected whether or not the dot matrix, which is made up of the three dots mentioned above, coincides with any of the patterns shown in FIGS. 7A–7C.

The gate 303 functions to perform the pattern matching in which the dot matrix is compared with the pattern PM1 (step S103). The gate 306 functions to enable the data flow when the answer to step S102 is affirmative (D=1) or when the answer to step S103 is affirmative (coincidence with the pattern PM1). The gate 307 functions to set the previous first flag FB(−y) for the upper contiguous dot to the first flag FB for the target dot (step S106). The output Do supplied from the line memory 311 to the gate 307 corresponds to the previous first flag FB(−y).

The gate 304 functions to perform the pattern matching in which the dot matrix is compared with the pattern PM2 (step S104). The gate 308 functions to set the previous first flag FB(+x) for the right-hand contiguous dot to the first flag FB for the target dot (step S107). The output Q supplied from the flip flop 312 to the gate 308 corresponds to the previous first flag FB(+x). The gate 305 functions to enable the data flow when the dot matrix does not coincide with both the patterns PM1 and PM2 (when the answer to step S104 is negative). The gate 309 functions to set the inverted value of the previous first flag FB(+x) for the right-hand contiguous dot to the first flag FB for the target dot (step S105). The output data supplied from the gate 310 corresponds to the first flag FB. The output Do supplied from the line memory 311 corresponds to the previous first flag FB(−y), the output Q supplied from the flip flop 312 corresponds to the previous first flag FB(+x), and the output −Q supplied from the flip flop 312 corresponds to the inverted value of the first previous first flag FB(+x). The first flag FB output by the gate 310 is thus supplied by the first flag detector 300 as an output signal Y.

Figure 17:
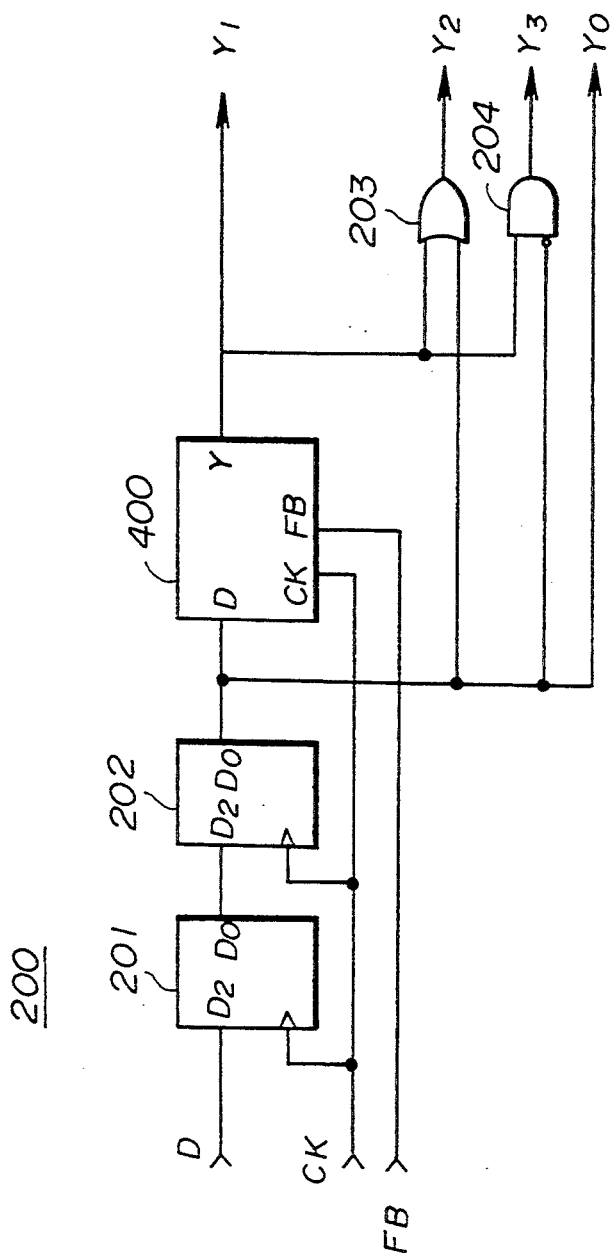
FIG. 17 is a system diagram showing a second flag setting circuit of the first embodiment.

FIG. 17 shows the construction of the second flag setting circuit 200. The second flag setting circuit 200 includes two FIFO line memories 201, 202, two logic gates 203, 204, and a second flag detector 400. The line memories 201, 202 are used as a delay storage similar to the line memories 301, 311 shown in FIG. 16. In the second flag detector 400, a second flag FA is determined for each dot of the image data through pattern matching and a signal indicating the value of the second flag FA is output as an output signal Y1 of the second flag setting circuit 200.

The image data D, the clock CK, and the first flag data FB (supplied from the first flag setting circuit 100) are input to the second flag setting circuit 200. As described above, the first flag data FB delays from the image data D by two lines. The two line memories 201, 202 are provided to delay the input image data D by two lines such that the image data Do supplied from the memory 202 to the detector 400 is synchronous with the first flag data FB input to the detector 400. Therefore, the image data Do and the first flag data FB, input to the second flag detector 400, correspond to the same dot of the image data.

The second flag setting circuit 200 sets the second flag FA for each dot of the input image data. The signal Y1 indicating the value of the second flag FA is supplied from the second flag detector 400. A signal Y0 indicating the value of the image data D is supplied from the line memory 202 as an output signal of the circuit 200. The signals Y0 and Y1 correspond to the same dot of the image data. A signal Y2 (=Y0+Y1) indicating the value of the paint signal (FA+D) is supplied from the gate 203 ("+" denotes OR operation). A signal Y3 (=Y1*−Y0) indicating the value of the area detection signal (FA*−D) is supplied from the gate 204 (where "*" denotes "AND" operation, and "−Y0" and "−D" denote the inverted values of the signal Y0 and the image data D).

Figure 18:
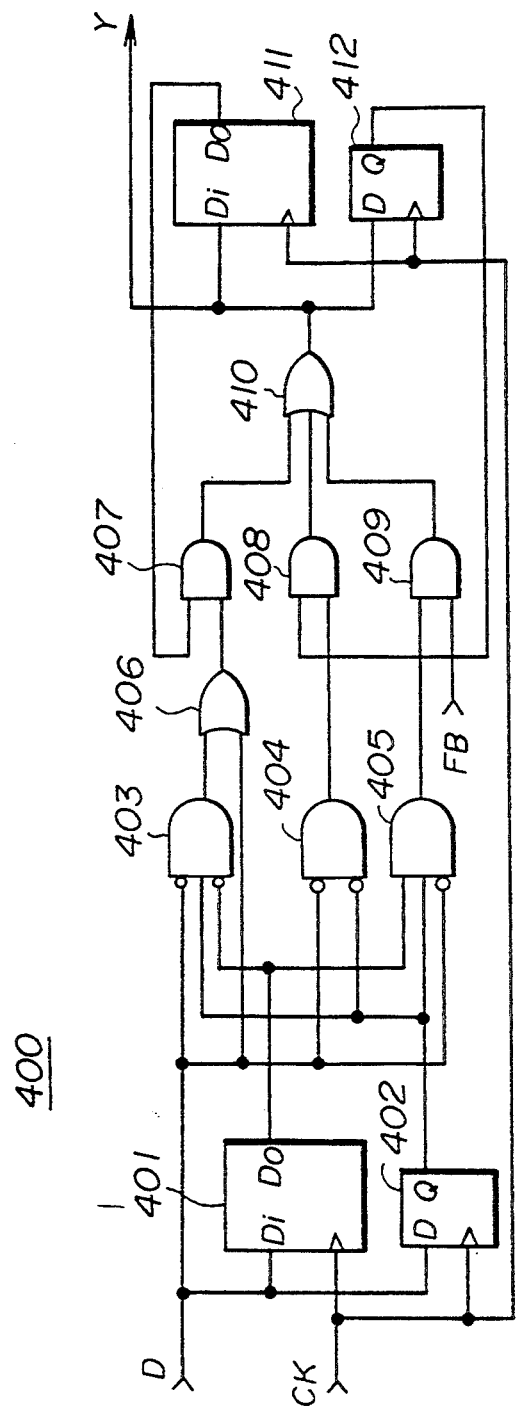
FIG. 18 is a system diagram showing a second flag detector of the second flag setting circuit.

FIG. 18 shows the construction of the second flag detector 400. This second flag detector 400 includes two FIFO line memories 401, 411, two D-type flip flops 402, 412, and eight logic gates 403 through 410. The circuit 400 shown in FIG. 18 is the same as the first flag detector 300 shown in FIG. 16 except that the gate 409 has an input terminal to which the first flag FB is supplied from the circuit 100, and that the flip flop 412 has only one output terminal (with no output terminal −Q corresponding to that of the flip flop 312 shown in FIG. 16).

The operation performed by the second flag detector 400 shown in FIG. 18 will now be described in conjunction with the second flag setting process shown in FIG. 9. In this second flag detector 400, the bi-level image data D (input to the detector 400), the output Do (supplied from the line memory 401), and the output Q (supplied from the flip flop 402) respectively correspond to the target dot, the upper contiguous dot, and the left-hand contiguous dot. In the pattern matching, it is detected whether or not the dot matrix, which is made up of the three dots mentioned above, coincides with any of the patterns shown in FIGS. 10A through 10C.

The gate 403 functions to perform the pattern matching in which the dot matrix is compared with the pattern PM3 (step S203). The gate 406 functions to proceed to a data flow when the answer to step S202 is affirmative (D=1) or when the answer to step S203 is affirmative (coincidence with the pattern PM3). The gate 407 functions to set the previous second flag FA(−y) for the upper contiguous dot to the second flag FA for the target dot (step S206). The output Do supplied from the line memory 411 to the gate 407 corresponds to the previous second flag FA(−y).

The gate 404 functions to perform the pattern matching in which the dot matrix is compared with the pattern PM4 (step S204). The gate 408 functions to set the previous second flag FA(−x) for the left-hand contiguous dot to the second flag FA for the target dot (step S207). As described above, the output Q supplied from the flip flop 412 to the gate 408 corresponds to the previous second flag FA(−x). The gate 405 functions to proceed to a data flow when the dot matrix does not coincide with both the patterns PM3 and PM4 (when the answer to step S104 is negative). The gate 409 functions to set the previous first flag FB to the second flag FA (step S205). The first flag data FB input to a terminal of the gate 409 is supplied from the first flag detector 300 as described above. The output data supplied from the gate 410 corresponds to the second flag FA. The second flag FA output by the gate 410 is thus supplied by the second flag detector 400 as the output signal Y.

As described above in the first embodiment, the second flags for all the dots of the input image data are set for each dot by performing the first flag setting process and the second flag setting process by means of the first flag setting circuit 100 and the second flag setting circuit 200, respectively. Thus, it is possible to correctly and reliably detect whether a dot of the image data lies in the inside of a closed-loop area or on the outside thereof based on the value of the second flag thus set for the dot. Also, it is possible for the present invention to generate an area detection signal Y3 and a paint signal Y2 based on the second flag data FA and the image data D for each dot of the image data. Thus, it is possible for the recording unit 30 to print a copy in which the inside of the closed-loop area is painted in accordance with the paint signal Y2 and the area detection signal Y3.

In the foregoing description, a description of the setting of initial conditions of the flip flops, the counters, the RAMs and the line memories has been omitted for the sake of simplicity or easy understanding of the method and apparatus of the present invention. However, it would be obvious to those skilled in the art to set the flip flops, the counters, the RAMs and the line memories in appropriate initial conditions by means of inputting suitable signals XG, YG, XSYNC, CK, etc. to the first and second flag setting circuits.

Figure 19:
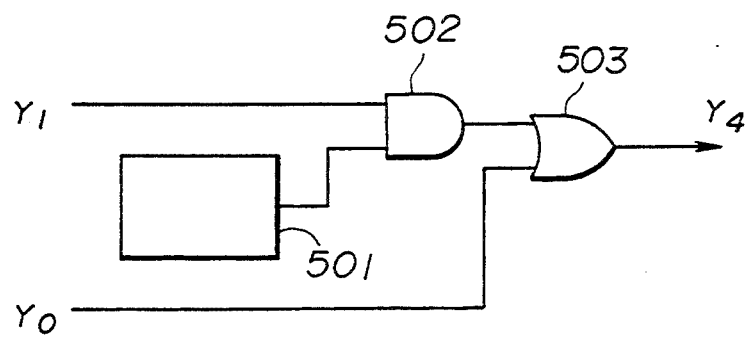
FIG. 19 is a system diagram showing a circuit for outputting image data used to print a copy in which the inside of a closed-loop area is painted with a specific character pattern.
Figures 20A, 20B:
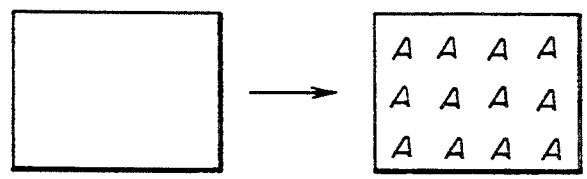
FIGS. 20A and 20B are diagrams showing a closed-loop area on a document, and a copy printed in accordance with the image data output by the circuit shown in FIG. 19.

FIG. 19 shows a circuit 500 for outputting image data used to print a copy in which the inside of a closed-loop area is painted with a specific character pattern. An image data Y0 (which is the image data D input to the circuits 100 and 200) and a flag data Y1 (which is the output signal Y1 supplied from the circuit 200) are input to the circuit 500 shown in FIG. 19. The circuit 500 includes a character pattern generator 501, and two logic gates 502, 503. The generator 501 generates a specific character pattern. A signal Y4 is supplied from the gate 503 as an output signal of the circuit 500, and this signal Y4 indicates image data of a copy in which the inside of a closed-loop area is painted with the specific character pattern generated by the character generator 501. FIG. 20A shows a closed-loop area on a document. FIG. 20B shows a copy printed in accordance with the image data Y4 output by the circuit 500 shown in FIG. 19. As shown in FIG. 20B, the inside of the closed-loop area on the copy can be painted with a specific character pattern (the character pattern "A").

The present invention can be applied to a color digital copier capable of outputting a color copy in which an image is printed in several colors. The above mentioned color digital copier can output a copy in which the frame of a closed-loop area and the inside of the closed-loop area are painted in different colors if the printing operations according to the present invention are repeatedly performed in the different colors in accordance with the signal Y0 and the signal Y3. Also, it is possible that the outside of the closed-loop area in this copy is painted in a color different than the frame color and the inside area color.

SECOND EMBODIMENT

Figure 21:
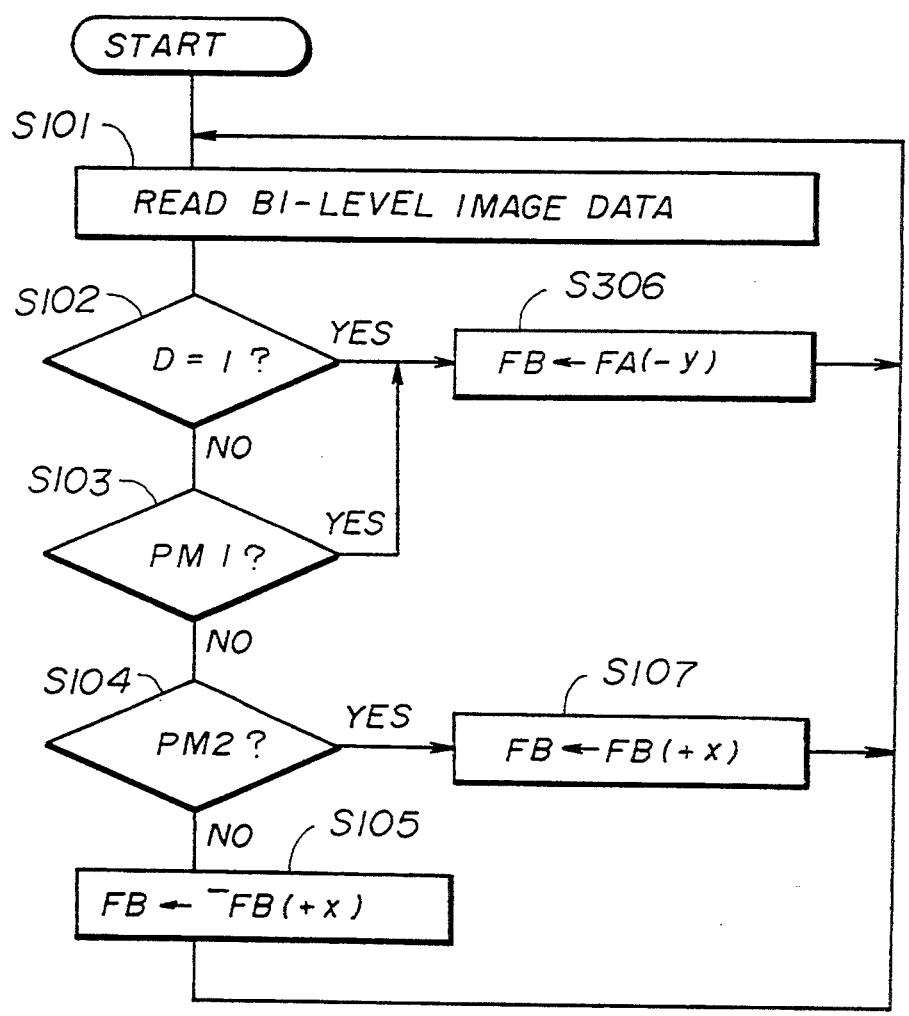
FIG. 21 is a flowchart for explaining a first flag setting process provided by a second embodiment of the present invention.

Next, a description will be given of a closed-loop area detecting method provided by a second embodiment. FIG. 21 shows a first flag setting process provided by the second embodiment. In FIG. 21, step S106 shown in FIG. 6 is replaced by step S306. In step S306, the previous second flag FA(−y) for the upper contiguous dot is set to the first flag FB for the target dot (i.e., FB ←-FA(−y)). The other steps in FIG. 21 are the same as the corresponding steps in FIG. 6.

Figure 22:
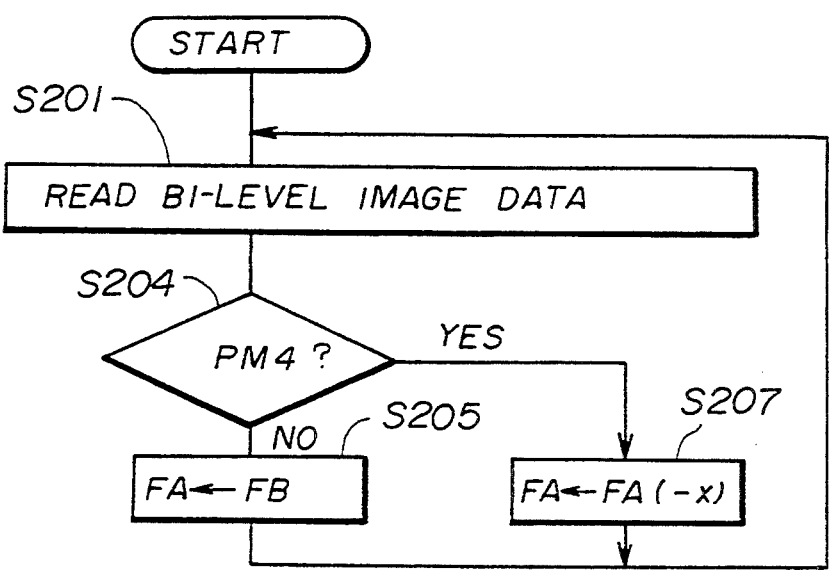
FIG. 22 is a flowchart for explaining a second flag setting process provided by the second embodiment.

FIG. 22 shows a second flag setting process provided by the second embodiment. In this second flag setting process, steps S202, S203 and S206 shown in FIG. 9 are omitted. The other steps in FIG. 22 are the same as the corresponding steps in FIG. 9.

Figure 25:
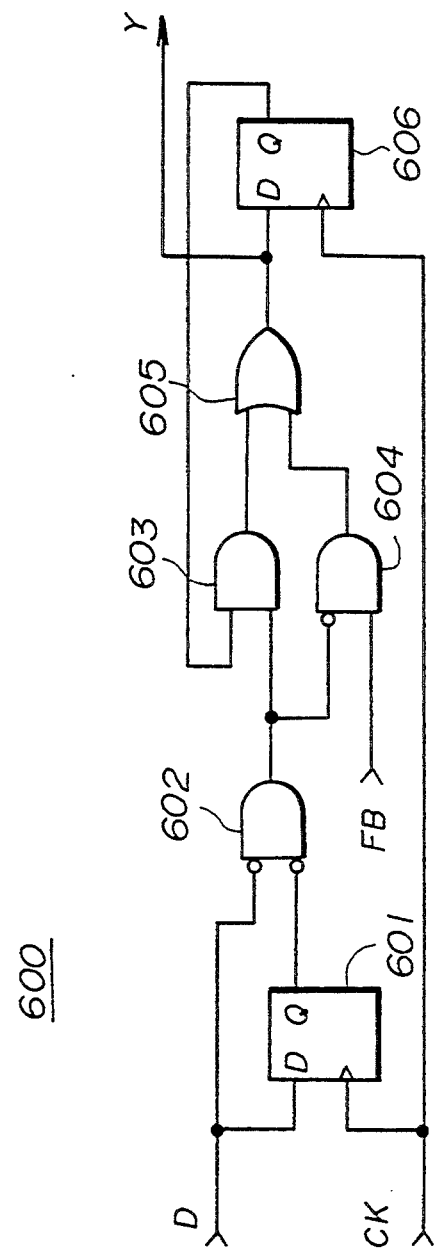
FIG. 25 is a system diagram showing a second flag detector of the second embodiment.

First and second flag setting circuits of the second embodiment, which respectively perform the first and second flag setting processes shown in FIG. 21 and FIG. 22, can be constructed by modifying the circuits shown in FIGS. 14 through 18. However, there are many components which are shared by the first and second embodiments, and the drawings associated with the second embodiment are omitted. Herein, only a second flag detector of the second embodiment is shown in FIG. 25.

Figure 23:
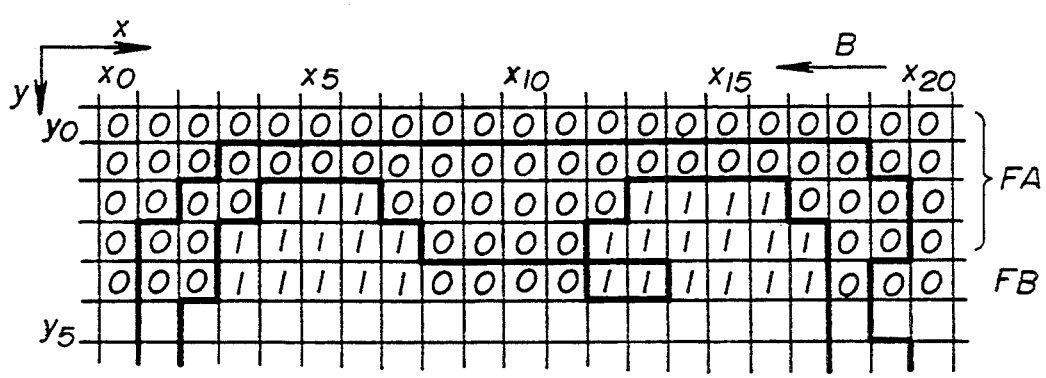
FIGS. 23 and 24 are diagrams for explaining the first and second flag setting processes shown in FIGS. 21 and 22.
Figure 24:
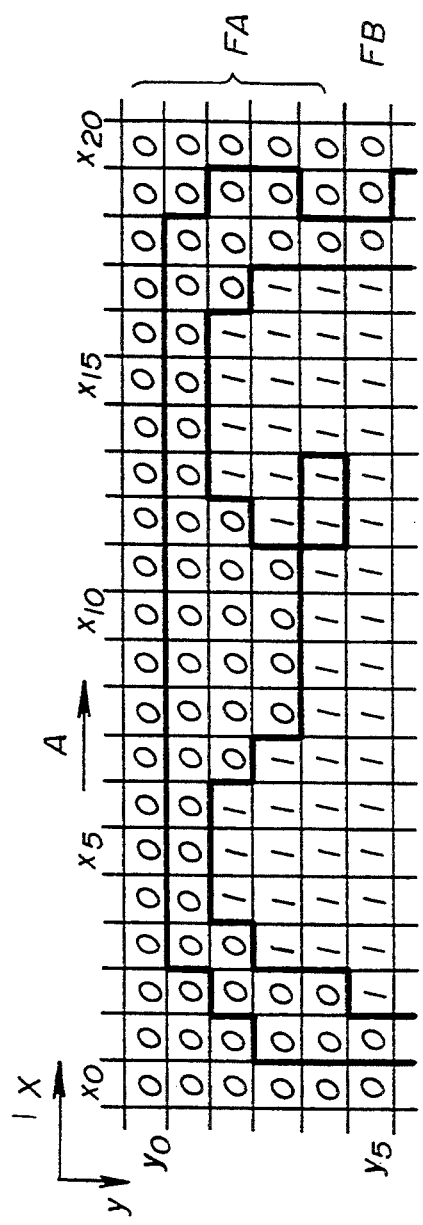

FIGS. 23 and 24 are diagrams for explaining the first and second flag setting processes shown in FIGS. 21 and 22. The input bi-level image data is the same as that shown in FIG. 5.

The first flag setting process shown in FIG. 21 will now be described. It is assumed that the process is performed to set the first flags FB for dots on a current line y4 after the first and second flags FB and FA for dots on the preceding lines y0 to y3 were set as shown in FIG. 23.

At (x18, y4), the input image data D=1, and the second flag FA(−y) is set to the first flag FB (step S306). The second flag FA(−y) is equal to 0 as in FIG. 23, and the first flag FB is set to 0.

At (x15, y4), the dot matrix coincides with the pattern PM1 and the second flag FA(−y) is set to the first flag FB (step S306). As the second flag FA(−y) is equal to 1, the first flag FB is set to 1.

At (x11, y4), the dot matrix does not coincide with the pattern PM2, and the inverted first flag −FB(+x) is set to the first flag FB (step S105). The inverted first flag −FB(+x) is equal to 0, and the first flag FB is set to 0.

At (x10, y4), the dot matrix coincides with the pattern PM2, and the first flag FB(+x) is set to the first flag FB (step S107). The first flag FB(+x) is equal to 0, and the first flag FB is set to 0.

At (x7, y4), the dot matrix coincides with the pattern PM1, and the second flag FA(−y) is set to the first flag FB (step S306). The second flag FA(−y) is equal to 1, and the first flag FB is set to 1. Thus, the first flags FB for the dots on a line y4 are as shown in FIG. 23.

Next, the second flag setting process shown in FIG. 22 will be described. An example will be described when the second flags FA for dots on a line y4 are being set by performing the second flag setting process after the second flags FA for dots on previous lines y0 through y3 and the first flags FB for the dots on a line y4 were set as shown in FIG. 23.

At (x2, y4), the dot matrix does not coincide with the pattern PM4 shown in FIG. 10B, and the first flag FB is set to the second flag FA (step S205). The first flag FB is equal to 0 as shown in FIG. 23, and the second flag FA is set to 0.

At (x3, y4), the dot matrix does not coincide with the pattern PM4, and the first flag FB is set to the second flag FA. The first flag FB is equal to 1, and the second flag FA is set to 1.

At (x4, y4), the dot matrix coincides with the pattern PM4, and the second flag FA(−x) is set to the second flag FA (step S207). The second flag FA(−x) is equal to 1, and the second flag FA is set to 1.

At (x5, y4), the dot matrix coincides with the pattern PM4, and the second flag FA(−x) is set to the second flag FA. The second flag FA(−x) is equal to 1, and the second flag FA is set to 1.

Accordingly, the second flags FA for the dots on the scanning line y4 are set as shown in FIG. 24. Then, the first flags FB for dots on a following scanning line y5 are set as shown in FIG. 24. The first and second flag setting processes described above are repeatedly performed for the subsequent scanning lines y5, y6, . . . , and finally the second flags FA for all the dots of the input image are set.

If the second flag FA is equal to 1, it is detected that the target dot lies in the inside of the closed-loop image. If the second flag FA is equal to 0, it is detected that the target dot lines on the outside of the closed-loop image. Therefore, it is possible to generate a paint signal and an area detection signal from the second flag data and the image data, for each pixel, in order to output a copy in which the inside of the closed-loop image is painted.

FIG. 25 shows a second flag detector 600 of the second embodiment of the present invention. This second flag detector includes two D-type flip flops 601 and 606, and four logic gates 602 through 605. The input image data D for a target dot is supplied to the input D of the flip flop 601, and the image data D(−x) for a dot contiguous to and at the left of the target dot on a scanning line is supplied from the output Q of the flip flop 601. The gate 602 serves to perform the pattern matching corresponding to step S204 in FIG. 22.

If the coincidence (the pattern PM4) occurs, a flag setting signal, used to set the second flag FA(−x) to the second flag FA, is output from the gate 603. If the coincidence (the pattern PM4) does not occur, a flag setting signal, used to set the first flag FB to the second flag FA, is output from the gate 604. A signal indicating the first flag FA for the target dot is supplied from the gate 605 as the output signal Y. The same signal for the target dot is also supplied to the input terminal D of the flip flop 606, and a signal indicating the second flag FA(−x) for the contiguous dot is supplied from the output Q of the flip flop 606 to the input of the gate 603.

THIRD EMBODIMENT

Figure 26:
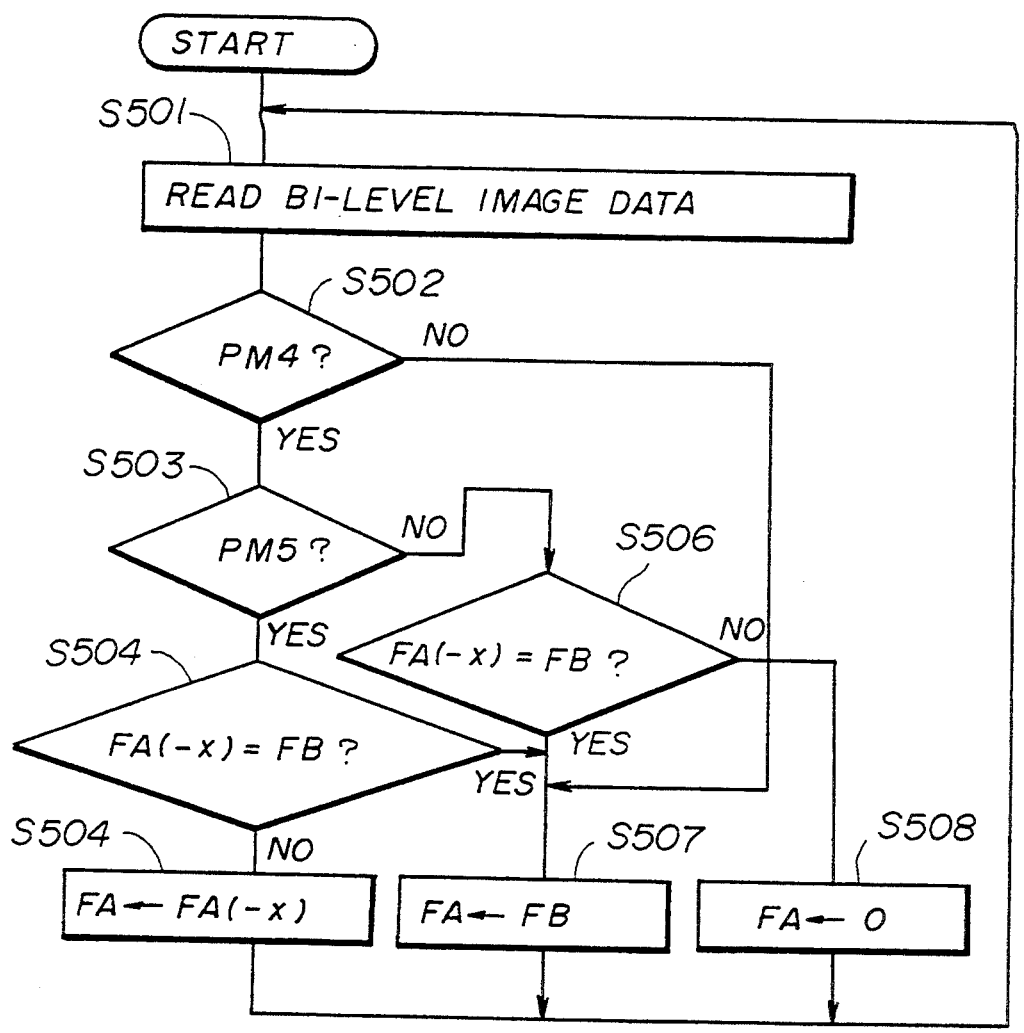
FIG. 26 is a flowchart for explaining a second flag setting process provided by a third embodiment of the present invention.
Figure 27:
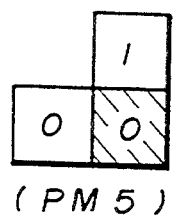
FIG. 27 is a diagram showing a pattern in a pattern matching step of the second flag setting process shown in FIG. 26.
Figure 28:
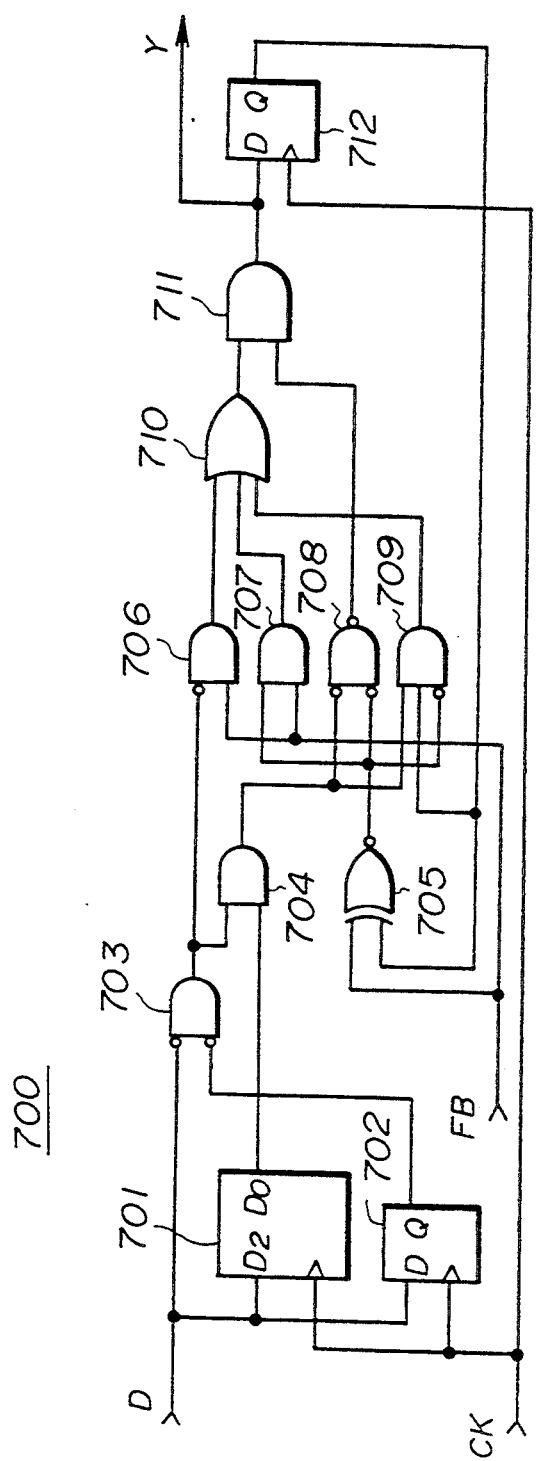
FIG. 28 is a system diagram showing a second flag detector of the third embodiment.

Next, a description will be given of a second flag setting process provided by the third embodiment of the present invention. FIG. 26 shows this second flag setting process. FIG. 27 shows a pattern used in a pattern matching step of the second flag setting process. FIG. 28 shows a second flag detector 700 of the third embodiment. This second flag detector 700 includes a FIFO (first-in first-out) line memory 701, two D-type flip flops 701 and 712, and nine logic elements 703 through 711. The other construction and functions of the second flag detector in FIG. 28 are essentially the same as those of the second flag detector shown in FIG. 18, and a description thereof will be omitted.

In the second flag setting process shown in FIG. 26, step S501 reads the input image data. In step S502, a pattern matching in which a dot matrix of the input image data is compared with the pattern PM4 shown in FIG. 10B is performed. If the dot matrix coincides with the pattern PM4 in step S502, step S503 is performed. If the coincidence does not occur in step S502, step S507 sets the first flag FB to the second flag FA (FA FB).

Step S503 performs another pattern matching in which the dot matrix is compared with the pattern PM5 shown in FIG. 27. If the dot matrix coincides with the pattern PM5, step S504 is performed. If the coincidence does not occur in step S503, step S506 detects whether or not the second flag FA($-x$) is equal to the first flag FB. If the answer to step S506 is affirmative, the above step S507 is performed. If the answer to step S506 is negative, step S508 sets the second flag FA to zero (FA $\leftarrow$ 0).

Step S504 detects whether or not the second flag FA($-x$) for the left-hand, contiguous dot is equal to the first flag FB for the target dot. If the answer to step S504 is affirmative, the above step S507 is performed. If the answer to step S504 is negative, step S505 sets the second flag FA($-x$) to the second flag FA (FA $\leftarrow$ FA($-x$)). The effects of the third embodiment described above are similar to the effects of the first embodiment.

FOURTH EMBODIMENT

Next, a closed-loop area detecting method provided by the fourth embodiment of the present invention will now be described. In the fourth embodiment, the first and second flags FB and FA are set through the first and second flag setting processes described above, and then a third flag FC is set for each dot in accordance with the results of the first and second flags FB and FA through a third flag setting process of the fourth embodiment.

Figure 29:
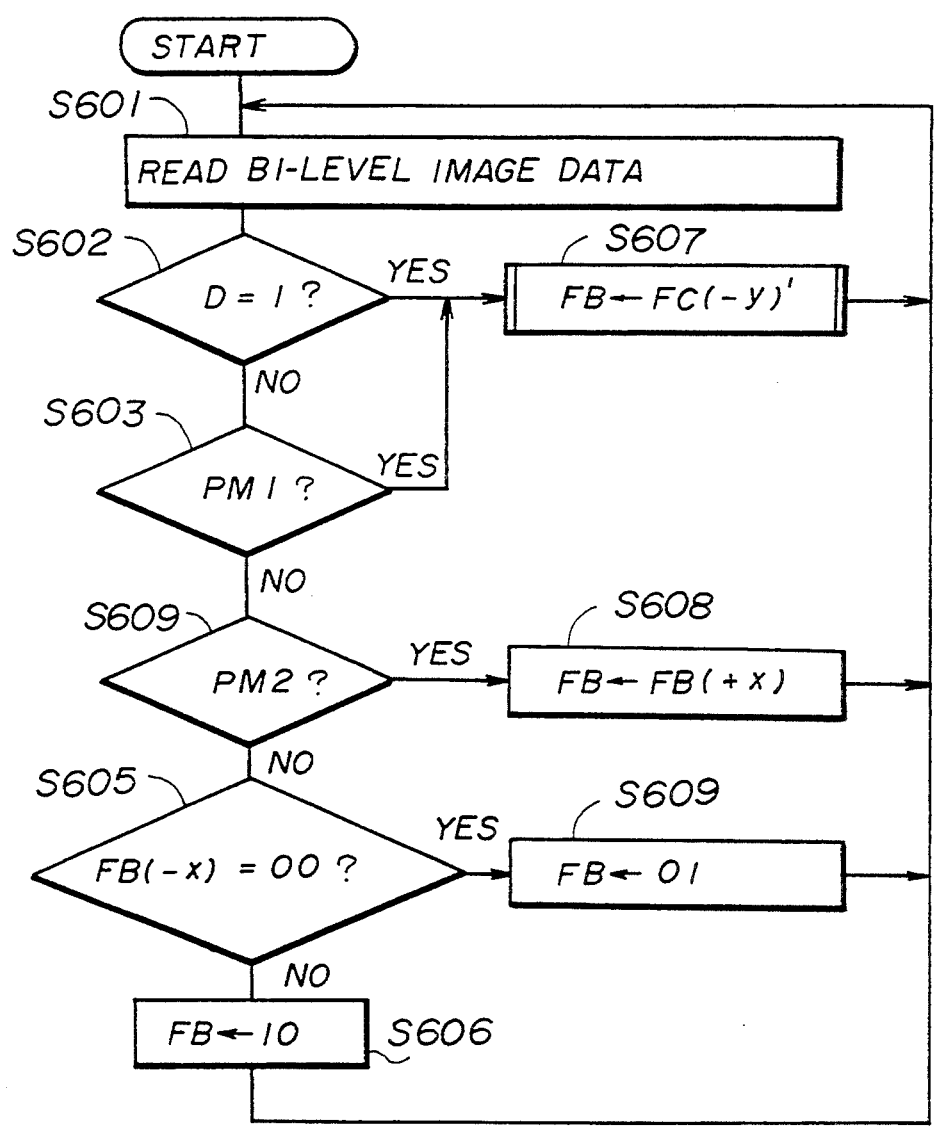
FIG. 29 is a flowchart for explaining a first flag setting process provided by a fourth embodiment of the present invention.
Figure 30:
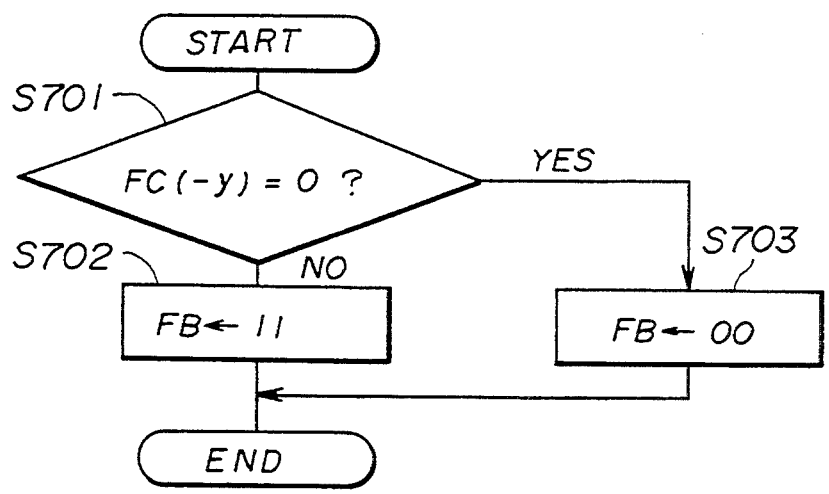
FIG. 30 is a flowchart for explaining a flag setting routine of the first flag setting process shown in FIG. 29.
Figure 31:
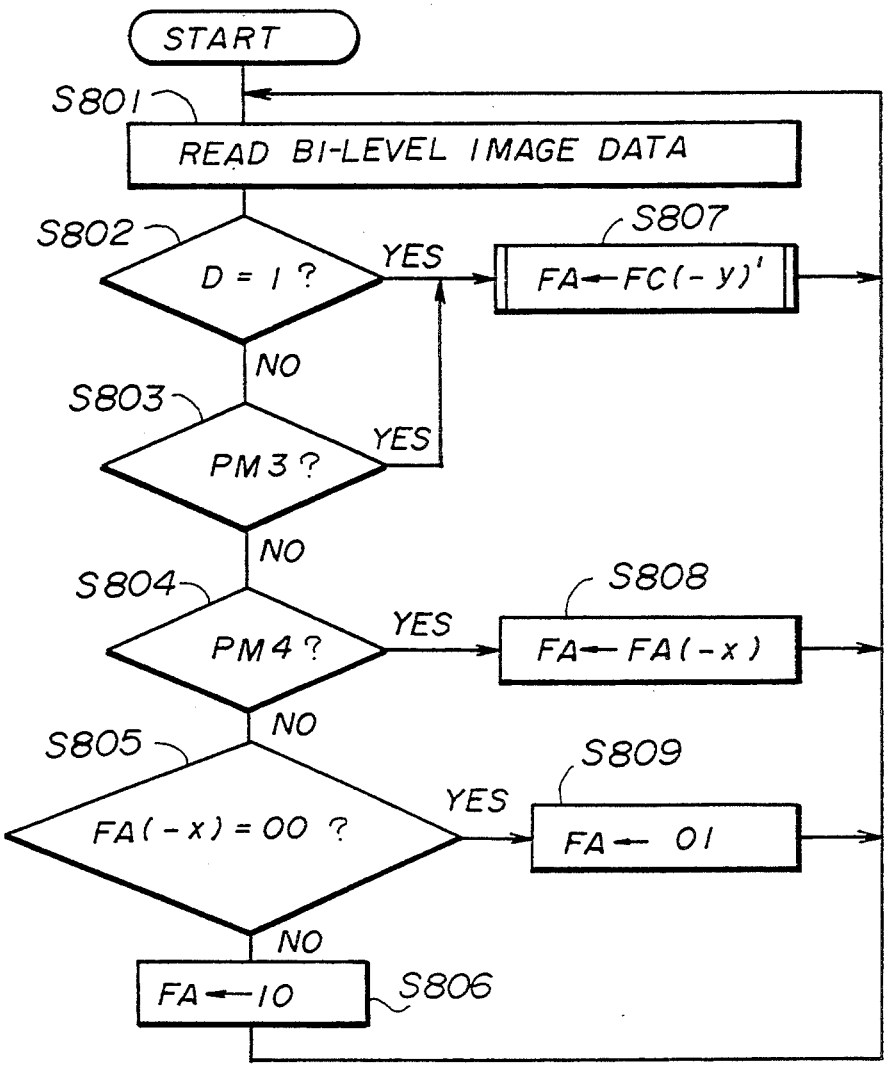
FIG. 31 is a flowchart for explaining a second flag setting process provided by the fourth embodiment.
Figure 32:
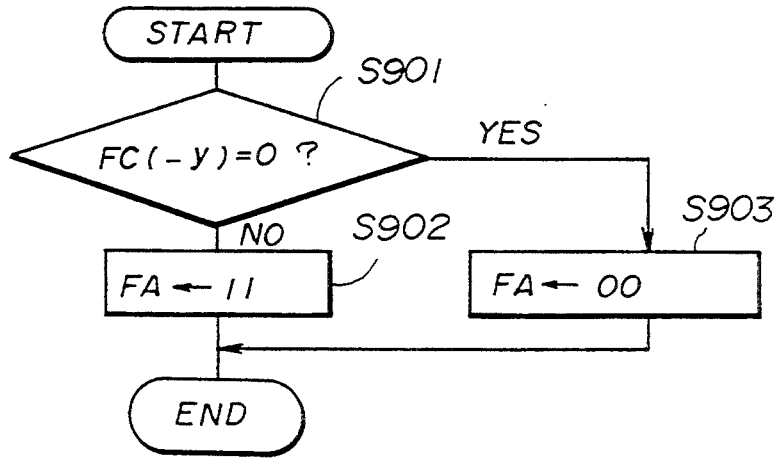
FIG. 32 is a flowchart for explaining a flag setting routine of the second flag setting process shown in FIG. 31.
Figure 33:
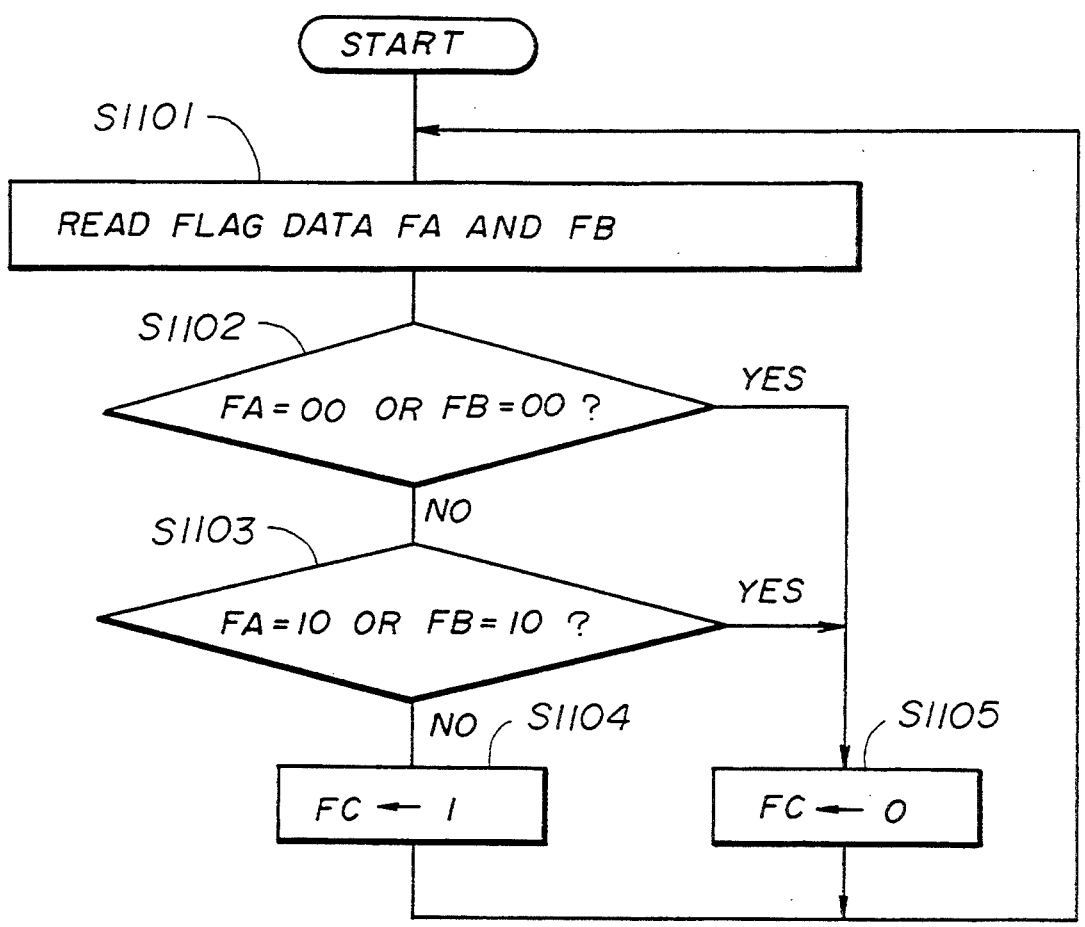
FIG. 33 is a flowchart for explaining a third flag setting process provided by the fourth embodiment.

FIG. 29 shows a first flag setting process provided by the fourth embodiment. Similarly to the first embodiment, the first flags FB are sequentially set for dots on each line of the image data in the direction B indicated in FIG. 5. FIG. 30 shows a flag setting step S607 "FB $\leftarrow$ FC($-y$)'" of the first flag setting process shown in FIG. 29. FIG. 31 shows a second flag setting process provided by the fourth embodiment. The second flags FA are sequentially set for dots on each line of the image data in the direction A indicated in FIG. 5. FIG. 32 shows a flag setting step S807 "FA $\leftarrow$ FC($-y$)'" of the second flag setting process shown in FIG. 31. FIG. 33 shows a third flag setting process in which the third flag FC is set for each dot in accordance with the results of the first and second flags FB and FA. The other steps are essentially the same as those of the first embodiment, a description thereof being omitted.

In the fourth embodiment, both the first flag FB and the second flag FA are expressed by two-bit flag data. When the flag data of the first and second flags is set to "00", it is temporarily detected that the dot lies on the outside of a closed-loop area. Similarly, the flag data "11" indicates that the dot lies in the inside of a closed-loop area, the flag data "01" indicates that the dot is a transient dot from the outside of a closed-loop area to the inside thereof, and the flag data "10" indicates that the dot is a transient dot from the inside of a closed-loop area to the outside thereof.

In the fourth embodiment, the third flag FC is expressed by one-bit flag data. When the flag data of the third flag is set to "0", it indicates that a dot of the image data lies on the outside of a closed-loop area. When the flag data is set to "1", it indicates that a dot of the image data lies in the inside of a closed-loop area.

Figure 34:
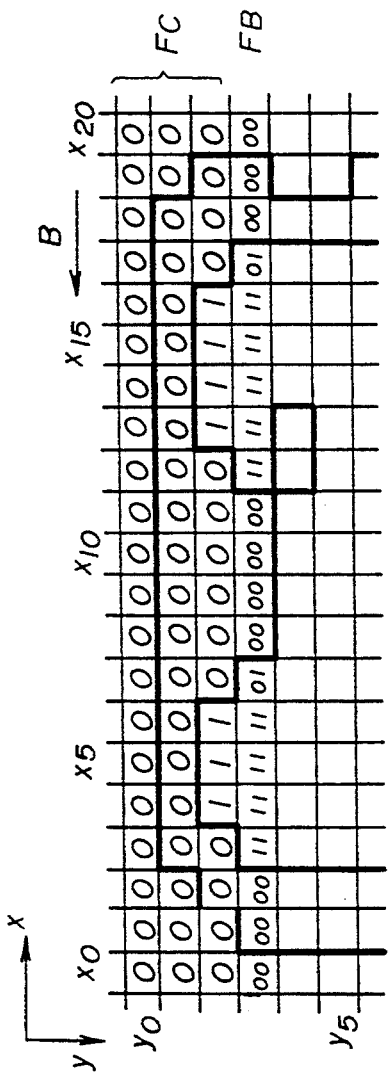
FIGS. 34 through 36 are diagrams for explaining the first, second, and third flag setting processes provided by the fourth embodiment.
Figure 35:
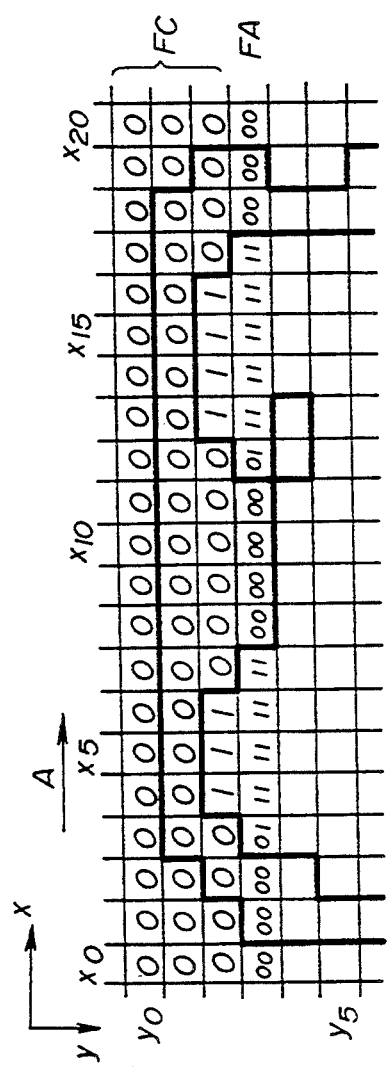
Figure 36:
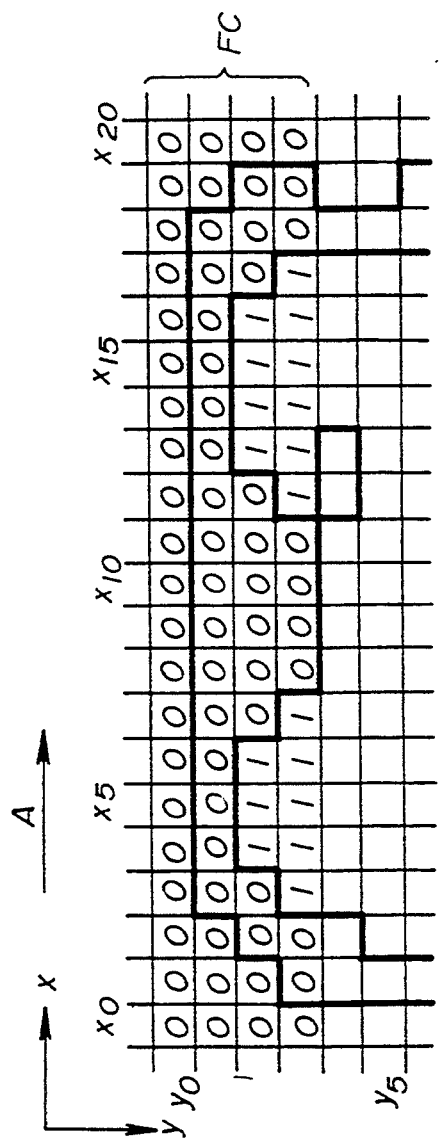

FIGS. 34 through 36 are diagrams for explaining the first, second, and third flag setting processes shown in FIGS. 29 through 33.

In FIG. 34, it is assumed that the third flags FC for dots on previous lines y0 through y2 were set as shown in FIG. 34, and that the first flags FB for dots on a line y3 are being set by performing the first flag setting process shown in FIG. 29.

For example, at (x17, y3), the dot matrix does not coincide with the pattern PM2 in step S604 shown in FIG. 29, and the previous first flag FB($+x$) is equal to "00" in step S605. Thus, the first flag FB for the dot at (x17, y3) is set to "01" (step S609).

In FIG. 35, it is assumed that the third flags FC for dots on previous lines y0 through y2 and the first flags FB for dots on a line y3 were set as shown in FIG. 34, and that the second flags FA for the dots on the line y3 are being set by performing the second flag setting process shown in FIG. 31.

For example, at (x4, y3), the dot matrix coincides with the pattern PM3 in step S803 shown in FIG. 31, and step S807 (FA $\leftarrow$ FC($-y$)') is then performed. In step S807, the flag setting routine shown in FIG. 32 is performed. Step S901 detects whether or not the previous third flag FC($-y$) for the upper contiguous dot is equal to 0. Since the previous third flag at (x4, y2) is equal to 1 as shown in FIG. 35, the answer to step S901 is negative. Thus, in step S902, the second flag FA for the dot at (x4, y3) is set to "11".

After the second flags FA for the dots on the line y3 were set as shown in FIG. 35, the third flags FC for the dots on the line y3 are set by performing the third flag setting process shown in FIG. 33. In the third flag setting process shown in FIG. 33, step 1101 reads the first and second flag data FB and FA for a dot on a current line of the image data. Step S1102 detects whether the first flag data FB or the second flag data FA is equal to "00". If the answer to step S1102 is affirmative, step S1105 sets the third flag FC for the dot to "0". If the answer to step S1102 is negative, step S1103 detects whether the first flag data FB or the second flag data FA is equal to "10". If the answer to step S1103 is affirmative, the above step S1105 is performed. If the answer to step S1103 is negative, step S1104 sets the third flag FC for the dot to 1.

For example, at (x3, y3), the first flag data FB is "11" and the second flag data FA is "01" as shown in FIGS. 34 and 35. Thus, the third flag FC for the dot at (x3, y3) is set to 1 (step S1104). In this manner, the third flags FC for the dots on the line y3 are set as shown in FIG. 36.

The values of the third flags for all the dots of the image data are determined by performing the third flag setting process in accordance with the results of the first and second flag setting processes. If the fourth embodiment of the present invention is applied to a digital copier, it is possible to more correctly and reliably detect whether a dot lies in the inside of a closed-loop area or on the outside thereof from the value of the third flag thus determined for the dot. It is possible to generate an accurate area detection signal and an accurate paint signal based on the third flag data and the image data for each dot. Thus, it is possible for the apparatus of the fourth embodiment to output a copy in which the inside of the closed-loop area is painted in accordance with the paint signal and the area detection signal.

Figure 37:
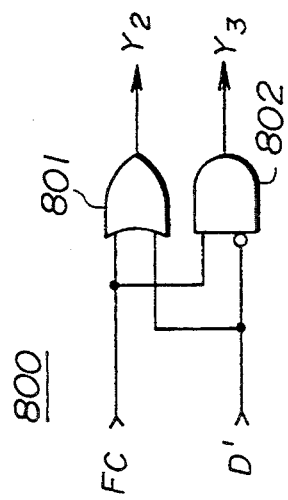
FIG. 37 is a system diagram showing a circuit for outputting a paint signal and an area detection signal based on third flag data and delay image data.

FIG. 37 shows a circuit 800 for outputting a paint signal (used to paint out the inside of a closed-loop area) and an area detection signal (indicating whether a dot lies in the inside of the closed-loop area). The circuit 800 shown in FIG. 37 includes two logic gates 801 and 802.

A third flag data FC (which is the flag data generated based on the result of the third flag setting process described above), and a delay image data D' (which delays from the image data D input to the circuits 100 and 200) is input to the gates 801 and 802. A paint signal Y2 used to paint out the inside of a closed-loop area is supplied from the gate 801 as an output of the circuit 800, and an area detection signal Y3 indicating whether a dot lies in the inside of the closed-loop area is supplied from the gate 802 as the other output of the circuit 800.

FIFTH EMBODIMENT

A description will now be given of a closed-loop detecting method provided by a fifth embodiment of the present invention with reference to FIGS. 38 through 41. In the fifth embodiment, a dot matrix arranged in a formation different from that of the dot matrix of the first embodiment is used to performed a pattern matching, and the number of pattern matching steps performed is increased. The dot matrix of the fifth embodiment is arranged in a 2×2 formation and made up of four dots: the target dot, the upper contiguous dot, the right-hand (or left-hand) contiguous dot, and the upper diagonally-contiguous dot.

Figure 38:
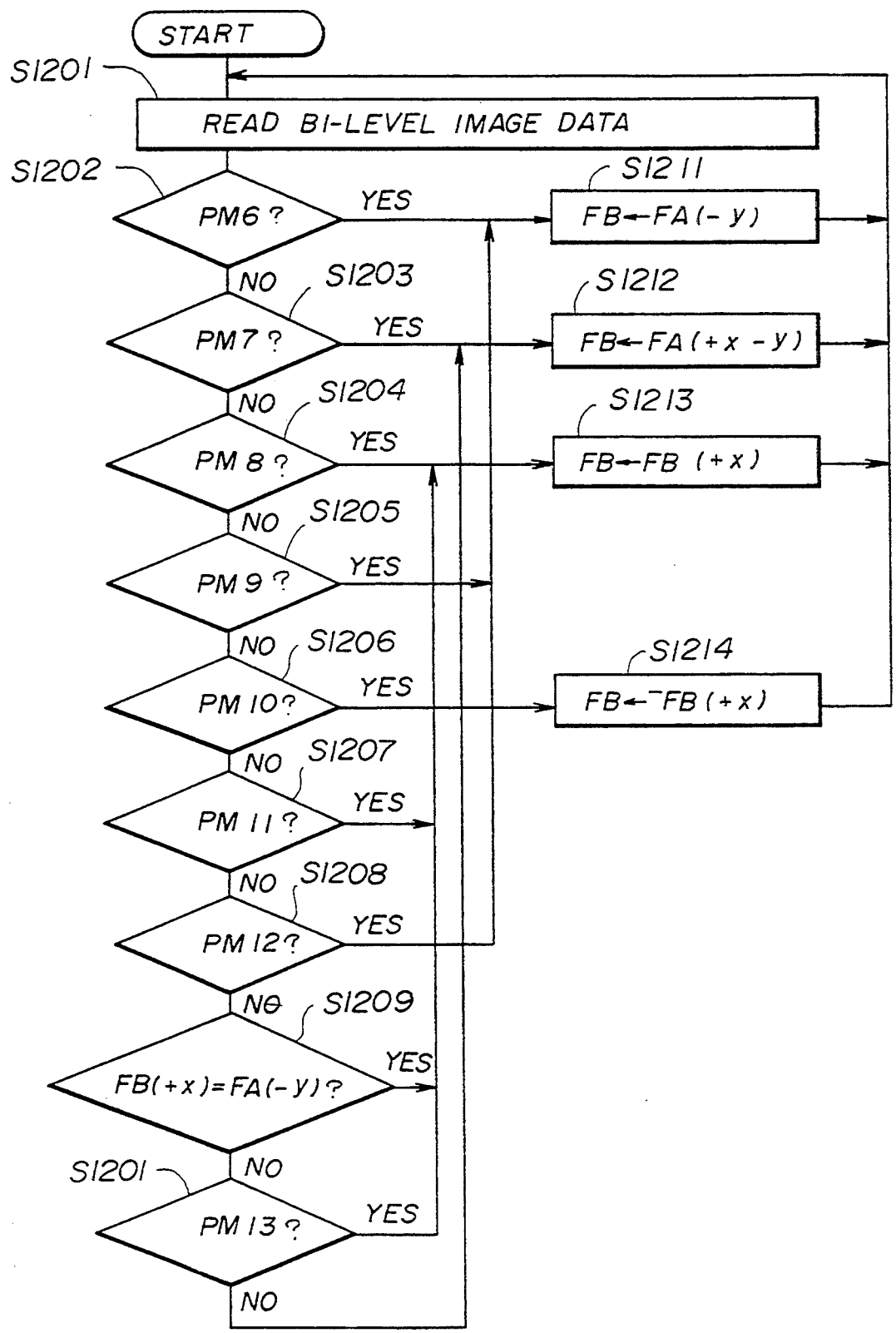
FIG. 38 is a flowchart for explaining a first flag setting process provided by a fifth embodiment of the present invention.
Figure 40:
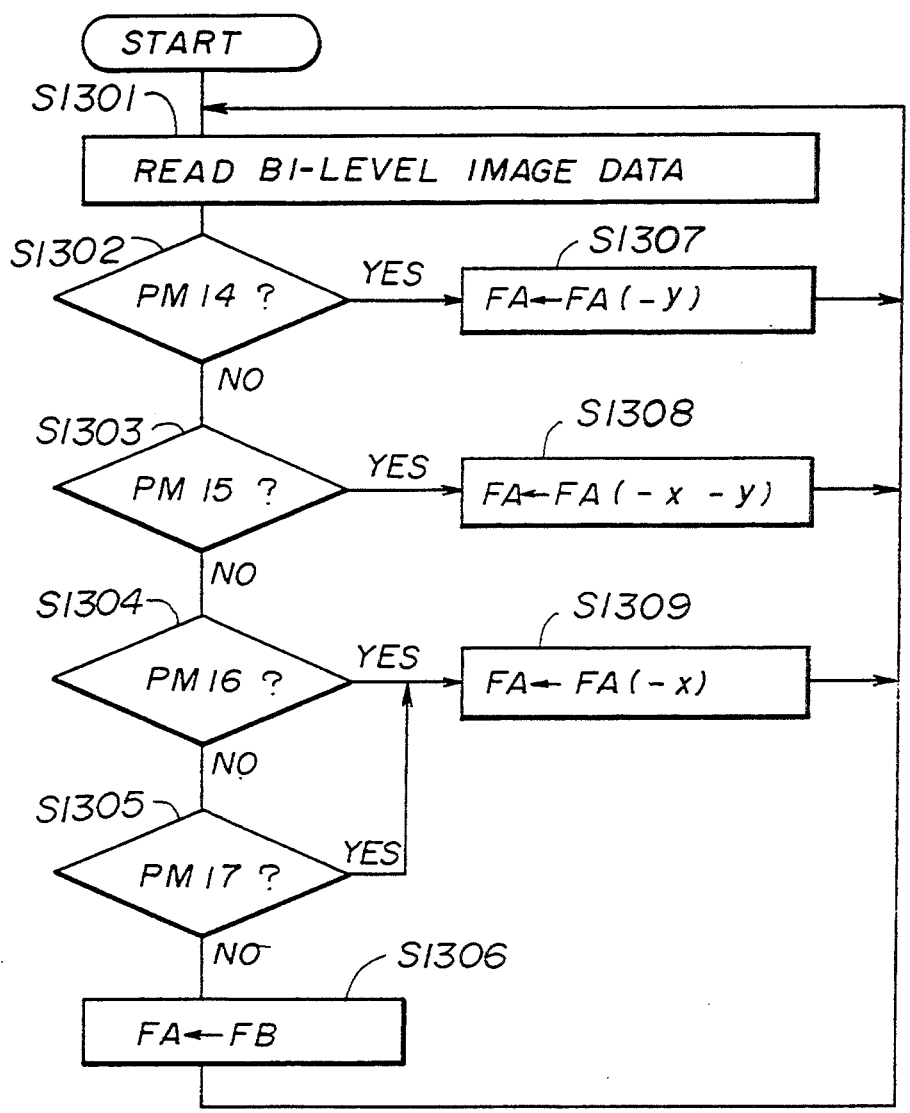
FIG. 40 is a flowchart for explaining a second flag setting process provided by the fifth embodiment.

In the fifth embodiment, the first flags for dots on a line in the image data are set by performing a first flag setting process shown in FIG. 38, and then the second flags for the dots on the line are set by performing a second flag setting process shown in FIG. 40 based on the result of the first flag setting process. Similarly to the previously described embodiments, the first flags for dots on a line are sequentially set in the direction "B" in FIG. 5, and then the second flags for the dots on the line are sequentially set in the direction "A" in FIG. 5, for the sake of building a simple, efficient image processing circuit.

In the first flag setting process shown in FIG. 38, step S1201 reads the bi-level image data for each dot. In steps S1202–S1208, several pattern matchings are performed. Also, in step S1210, another pattern matching is performed. In each of these steps, the dot matrix made up of the target dot, the upper contiguous dot, the right-hand contiguous dot, and the upper diagonally contiguous dot is compared with one of patterns PM6 to PM13. The patterns PM6 to PM13 are shown in FIGS. 39A to 39H, respectively. When the dot matrix does not coincide with the pattern PM12 shown in FIG. 39G in step S1208, the dot matrix is made up of four dots arranged in a pattern shown in FIG. 39I. When the dot pattern does not coincide with the pattern PM13 shown in FIG. 39H in step S1210, the dot matrix is made up of four dots arranged in a pattern shown in FIG. 39J.

When the dot matrix does not coincide with the pattern PM12 in step S1208, step S1209 is performed. In step S1209, it is detected whether or not the previous first flag FB(+x) for the right-hand contiguous dot coincides with the previous second flag FA(−y) for the upper contiguous dot. The value of the first flag FB for the target dot after the first flag setting process varies depending on the answer to step S1209.

When the dot matrix coincides with the pattern in step S1202, S1205 or S1208, step S1211 is performed to set the first flag FB for the target dot "FB←FA(−y)". When the dot matrix coincides with the pattern in step S1203 or when it does not coincide with the pattern in step S1210, step S1212 is perfumed to set the first flag FB for the target dot "FB←FA(+x−y)". When the dot matrix coincides with the pattern in step S1204, S1207 or S1210 or when the answer to step S1209 is affirmative, step S1213 is performed to set the first flag FB for the target dot "FB←FB(+x)". Only when the dot matrix coincides with the pattern in step S1206, step S1214 is performed to set the first flag FB for the target dot "FB←−FB (+x)".

In step S1211, the value of the previous second flag FA(−y) for the upper contiguous dot is set to the first flag FB for the target dot. In step S1212, the value of the previous second flag FA(+x−y) for the upper diagonally-contiguous dot is set to the first flag FB for the target dot. In step S1213, the value of the previous first flag FB(+x) for the upper contiguous dot is set to the first flag FB for the target dot. In step S1214, the inverted value of the previous first flag FB(+x) for the upper contiguous dot is set to the first flag FB for the target dot.

In the second flag setting process shown in FIG. 40, step S1301 reads the bi-level image data for each dot. In steps S1302–S1305, several pattern matchings are performed with several predetermined patterns. In each of these steps, the dot matrix made up of the target dot, the upper contiguous dot, the left-hand contiguous dot, and the upper diagonally contiguous dot is compared with one of patterns PM14 to PM17. The patterns PM14 to PM17 are shown in FIGS. 41A to 41D, respectively.

Figures 41A, 41B, 41C, 41D:
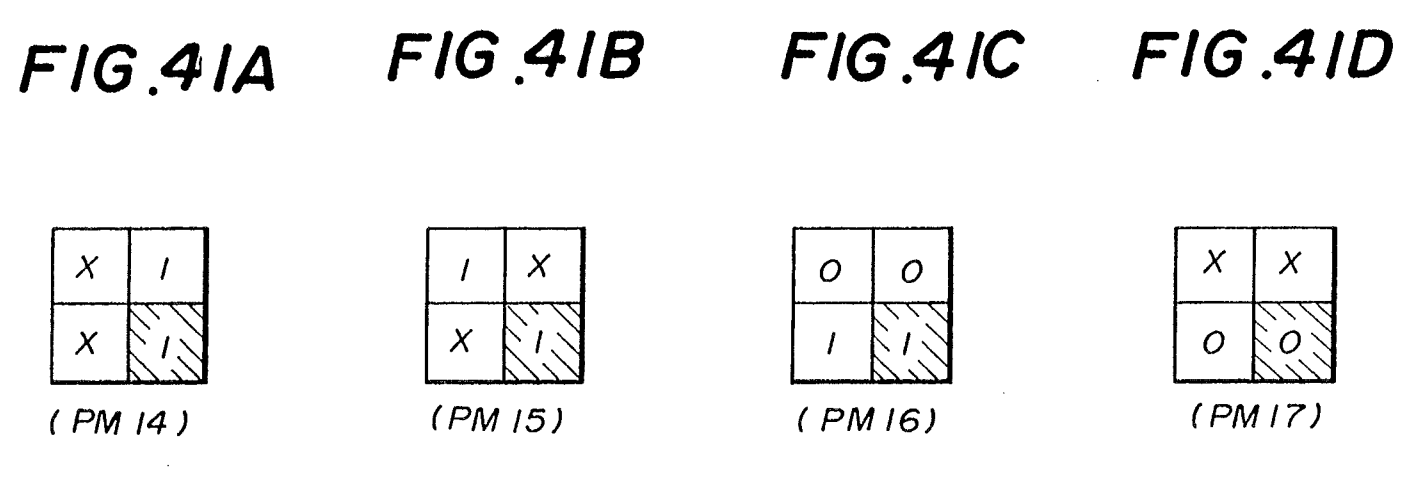

When the dot matrix does not coincide with the pattern PM17 shown in FIG. 41D in step S1305, step S1306 is performed. In step S1306, the value of the first flag FB is set to the second flag FA for the target dot (FA ←FB). When the dot matrix coincides with the pattern in step S1302, step S1307 is performed to set the previous second flag FA(−y) for the upper contiguous dot to the second flag FA for the target dot "FA ←FA(−y)". When the dot matrix coincides with the pattern in step S1303, step S1308 is performed to set the previous second flag FA(−x−y) for the upper diagonally-contiguous dot to the second flag FA for the target dot "FA←FA(−x−y)". When the dot matrix coincides with the pattern in step S1304 or S1305, step S1309 is performed to set the previous second flag FA(−x) for the left-hand contiguous dot to the second flag FA for the target dot "FA←FA(−x)".

After the first and second flag setting processes described above are performed for each dot of the image data, the second flag FA is set to "1" when the dot lies in the inside of a closed-loop area, and it is set to "0" when the dot lies on the outside of the closed-loop area. It is possible to generate a paint signal and an area detection signal from the flag data FA and the image data D as described above.

SIXTH EMBODIMENT

Figure 42:
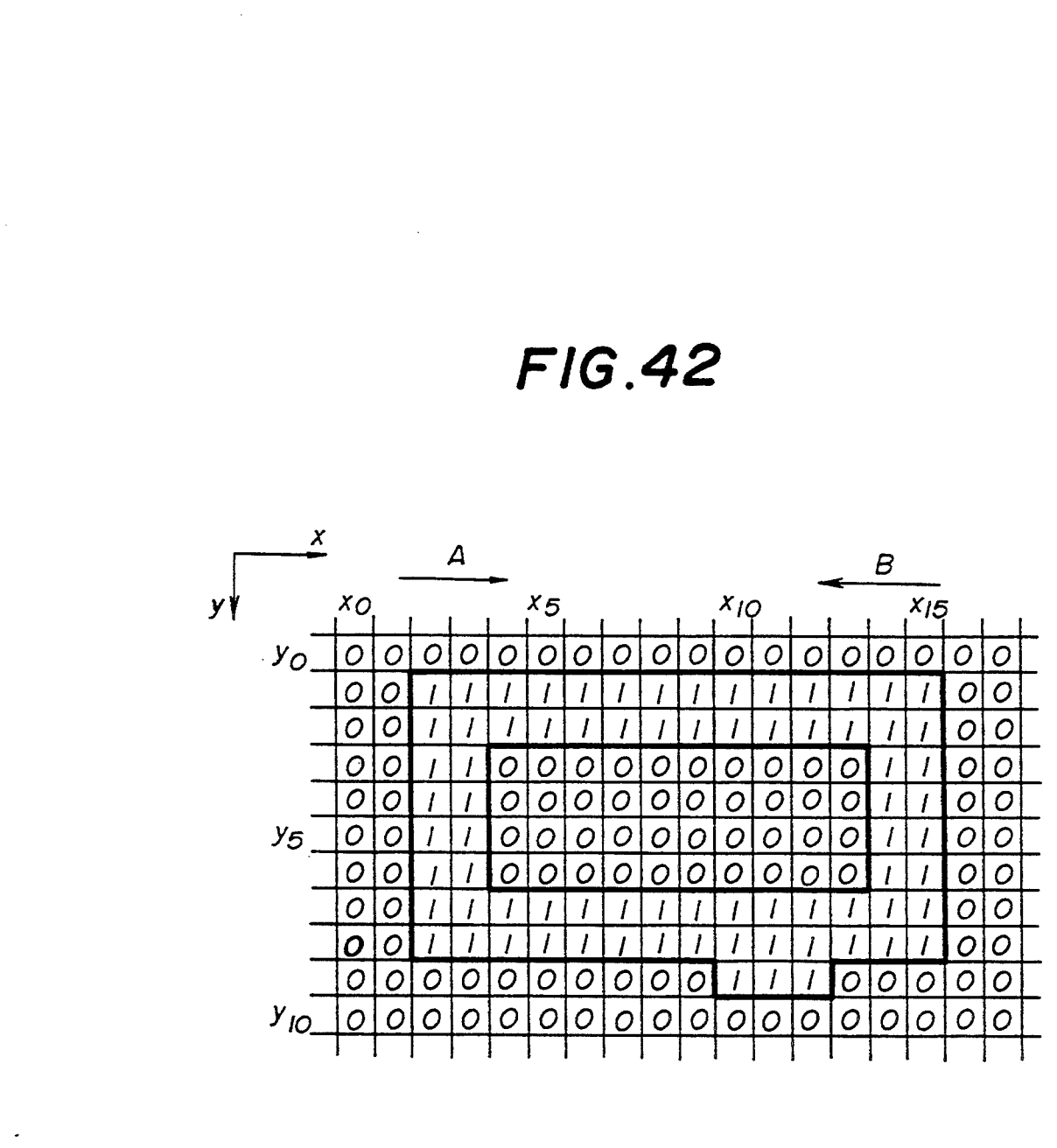

A description will now be given of a closed-loop detecting method provided by a sixth embodiment of the present invention, with reference to FIGS. 42 through 51. In the sixth embodiment, the first flags FB for dots on each line of bi-level image data shown in FIG. 42 are set by performing a first flag setting process shown in FIG. 43 for each dot on the line. The first flags FB for dots on each line are sequentially set in the direction "B" in FIG. 42. In the first flag setting process, a count value C indicating the number of successive first flags having the same value arranged on a sub scanning line is determined for each dot, and the first flag data and the count data for the dot are stored, which will be described below. The first flags FB for dots on a current line are set based on the first flag data and the count data on a previous line. Then, the second flags FA for dots on each line of the image data are set by performing a second flag setting process shown in FIG. 45 based on the results of the first flag setting process. The second flags FA for dots on each line are sequentially set in the direction "A" in FIG. 42.

FIG. 42 shows bi-level image data which is derived from input image data read from a document on which a closed-loop area is present. Each dot of the bi-level image data composed of $18 \times 11$ dots shown in FIG. 42 is binarized into either a white dot or a black dot through a known binarization. The bi-level image data is thus made up of a set of black and white dots as previously described. In FIG. 42, black dots are indicated by the numeral "1" and white dots are indicated by the numeral "0".

In order to explain the closed-loop area detecting method provided by the sixth embodiment, a case in which the image data shown in FIG. 42 is processed through the first and second flag setting processes shown in FIGS. 43 and 45 will now be described. Initially, before the first and second flag setting processes are performed, the first flag FB, the count value C, and the second flag FA are set to "0" for each dot.

Figure 43:
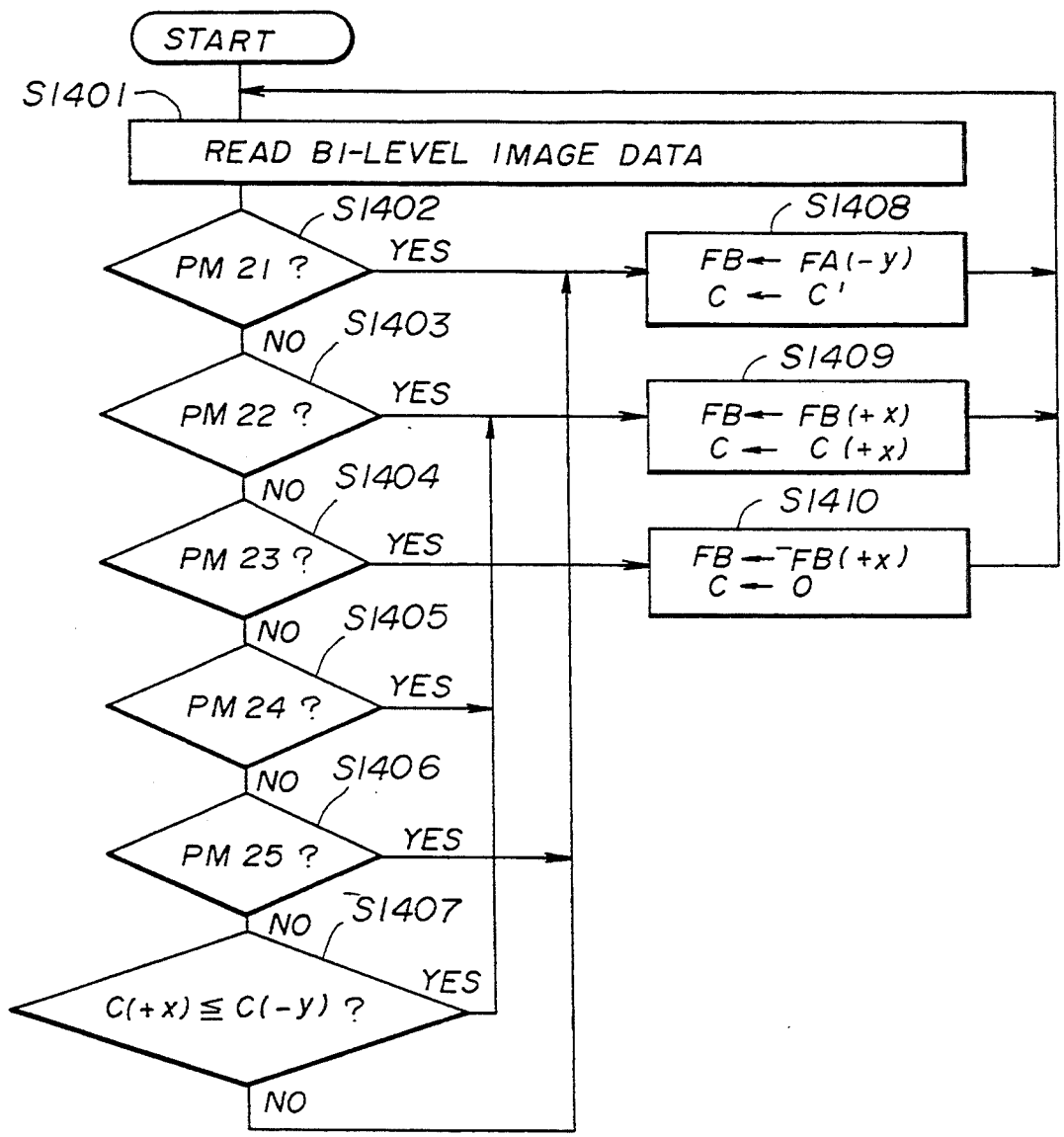
FIG. 43 is a flowchart for explaining a first flag setting process provided by a sixth embodiment of the present invention.

In the first flag setting process shown in FIG. 43, step S1401 reads the bi-level image data for each dot. In this process, the first flags for dots on a line in the image data are sequentially set in the direction "B" in FIG. 42. In steps S1402–S1406, several pattern matchings are performed. In each of these steps, the dot matrix made up of three dots: the target dot, the upper contiguous dot, and the right-hand contiguous dot is compared with one of patterns PM21–PM25. These patterns PM21 to PM25 are shown in FIGS. 44A to 44E, respectively. When the dot matrix does not coincide with the pattern PM25 shown in FIG. 44E in step S1406, the dot matrix is made up of three dots arranged in a pattern shown in FIG. 44F.

When the dot matrix does not coincide with the pattern PM25 in step S1406, step S1407 is performed. Step S1407 detects whether or not the previous count value $C(+x)$ for the right-hand contiguous dot is smaller than the previous count value $C(-y)$ for the upper contiguous dot "$C(+x) \leq C(-y)$?", which will be described below. If the answer to step S1407 is affirmative, step S1409 is performed. If the answer to step S1407 is negative, step S1408 is performed.

When the dot matrix coincides with the pattern PM21 or PM25 in step S1402 or S1406, step S1408 is performed. In step S1408, the previous second flag $FA(-y)$ for the upper contiguous dot is set to the first flag FB for the target dot, and a corrected count value $C'$ is set to the count value C for the target dot "FB←FA(−y), C←C'". The corrected count value $C'$ is obtained according to the following formula:

$$C' = C(-y) + 1 \quad \text{when } Cy < 127$$
$$C' = C(-y) \quad \text{when } Cy = 127$$

where Cy denotes a count value for a dot on a current line.

When the dot matrix coincides with the pattern PM22 or PM24 in step S1403 or S1405, step S1409 is performed. In step S1409, the previous first flag $FB(+x)$ for the right-hand contiguous dot is set to the first flag FB for the target dot, and the previous count value $C(+x)$ for the right-hand contiguous dot is set to the count value C for the target dot "FB←FB(+x), C←C(+x)".

When the dot matrix coincides with the pattern PM24 in step S1405, step S1410 is performed. In step S1410, the inverted value of the previous first flag $FB(+x)$ for the right-hand contiguous dot is set to the first flag FB for the target dot, and the count value C for the target dot is reset to 0.

After the first flag FB for the target dot on a current line of the image data is set through the first flag setting process, another first flag FB for another dot on the current line, which dot is contiguous to and to the left of the target dot, is set through the first flag setting process. After the first flags for all the dots on the line are set, the second flags for the dots on the line are sequentially set in the opposite direction "A" in FIG. 42.

Figure 45:
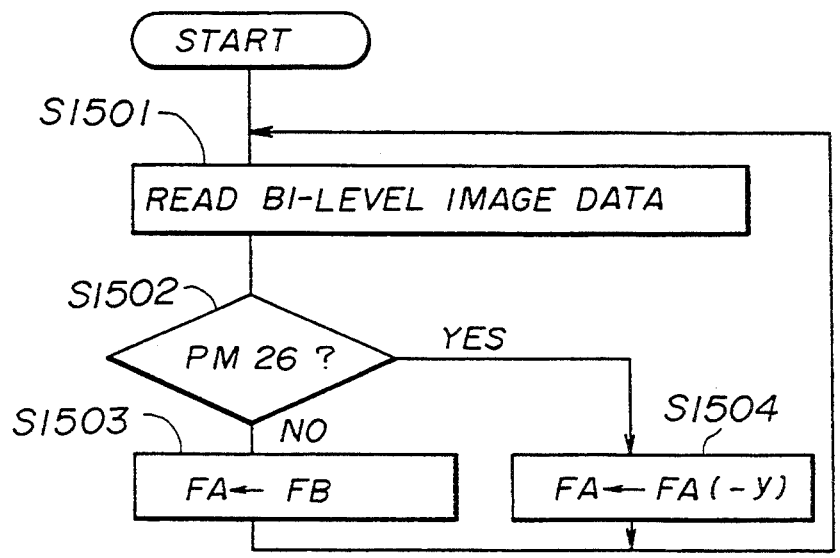
FIG. 45 is a flowchart for explaining a second flag setting process provided by the sixth embodiment of the present invention.
Figure 46:
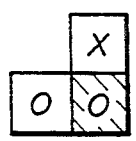
FIG. 46 is a diagram showing a pattern in a pattern matching step of the second flag setting process shown in FIG. 45.

In the second flag setting process shown in FIG. 45, step S1501 reads the bi-level image data for each dot. In this process, the second flags FA for dots on a line in the image data are sequentially set in the direction "A" in FIG. 42. In step S1502, a pattern matching is performed in which the dot matrix made up of the target dot, the upper contiguous dot and the left-hand contiguous dot is compared with a pattern PM26 shown in FIG. 46. When the dot matrix does not coincide with the pattern PM26, step S1503 is performed. Step S1503 sets the first flag FB for the target dot to the second flag FA for the target dot "FA←FB". When the dot matrix coincides with the pattern PM26, step S1504 is performed. Step S1504 sets the previous second flag $FA(-y)$ for the upper contiguous dot to the second flag FA for the target dot "FA←FA(−y)".

After the second flag FA for the target dot on a line in the image data is set by performing the second flag setting process based on the results of the first flag setting process, another second flag FA for another dot on the line, which dot is contiguous to and to the right of the target dot, is set through the second flag setting process. After the second flags for all the dots on the line are set, the first flags for dots on another line contiguous to and below the current line are sequentially set in the direction "B" in FIG. 42 and then the second flags for the dots on the new line are sequentially set in the direction "A" in FIG. 42. The above procedure is repeated until the second flags for all the dots of the image data are set.

Figures 47, 48:
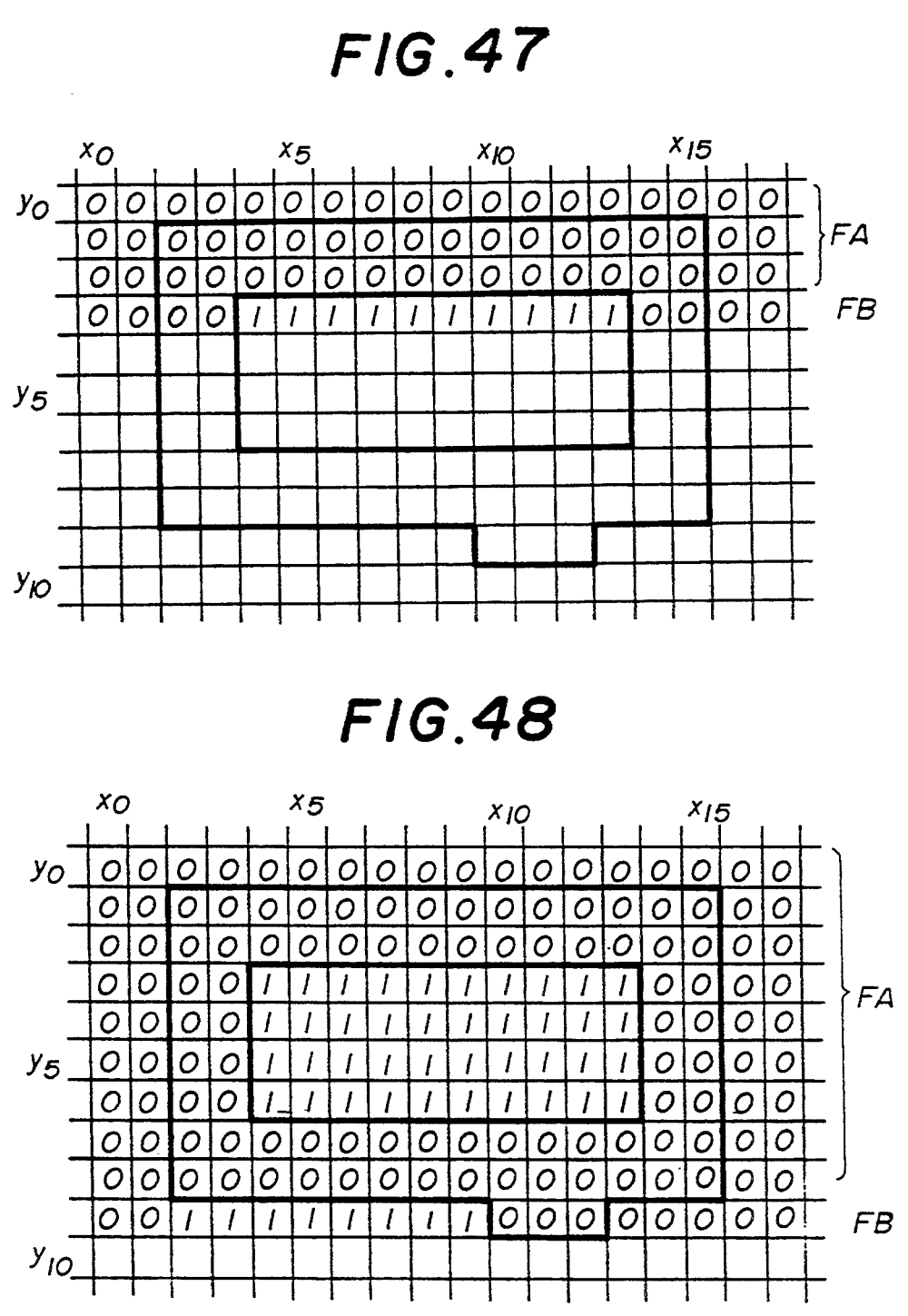

FIG. 47 shows the resulting data of the first and second flags when the first and second flag setting processes have been performed for dots on lines y0 to y2 of the image data shown in FIG. 42. In the data shown in FIG. 47, the second flags FA for $18 \times 3$ dots on the lines y0–y2 have been set. Herein, the operations of the first flag setting process shown in FIG. 43 in which the first flags FB for dots on a line y3 are being set will be described. For example, at (x15, y3), the dot matrix coincides with the pattern PM21, and the previous second flag $FA(-y)$ for the upper contiguous dot is equal to 0. Thus, the first flag FB at (x15, y3) is set to 0.

At (x13, y3), the dot matrix coincides with the pattern PM23, and the inverted value of the previous first flag $FB(+x)$ for the right-hand contiguous dot is equal to 1. Thus, the first flag FB at (x13, y3) is set to 1.

At (x11, y3), the dot matrix coincides with the pattern PM24, and the previous first flag $FB(+x)$ for the right-hand contiguous dot is equal to 1. Thus, the first flag FB at (x11, y3) is set to 1. Accordingly, the first flags FB for all the dots on the line y3 are set as shown in FIG. 47.

FIG. 48 shows the resulting data of the first and second flags when the first and second flag setting processes have been performed for dots on lines y0 to y8 of the image data shown in FIG. 42. In the data shown in FIG. 48, the second flags FA for 18×9 dots on the lines y0-y8 have been set. Herein, the operations of the first flag setting process shown in FIG. 43 in which the first flags FB for dots on a line y9 are being set will be described. For example, at (x9, y9), the dot matrix coincides with the pattern PM23, and the inverted value of the previous first flag FB(+x) for the right-hand contiguous dot is equal to 1. Thus, the first flag FB at (x9, y9) is set to 1.

At (x2, y9), the dot matrix coincides with the pattern PM24, and the previous first flag FB(+x) for the right-hand contiguous dot is equal to 1. Thus, the first flag FB at (x2, y9) is set to 1.

At (x1, y9), the dot matrix does not coincide with any of the patterns PM21 to PM25. It does coincide with the pattern shown in FIG. 44F. Then, step S1407 is performed to detect whether or not the previous count value C(+x) for the right-hand contiguous dot is smaller than the previous count value C(−y) for the upper contiguous dot "C(+x)≦C(−y)".

Before step S1407 is performed at (x1, y9), the count value at (x9, y9) has been reset to 0, and the count values at (x9, y9) through (x2, y9) have also been reset to 0. Thus, the previous count value C(+x) for the dot at (x1, y9) is detected as being equal to 0. The previous count value C(−y) for the upper contiguous dot at (x1, y9) is equal to a count value C1 at (x1, y8). According to the above mentioned formula, the count value C1 is indicated as C1=C2+1 where C2 denotes a count value at (x1, y7). If C3 is assumed to be a count value at (x1, y6), the count value C1 to be obtained is indicated as C1=C2+1=(C3+1)+1=C3+2. If C4 is assumed to be a count value at (x1, y5), the count value C1 is indicated as C1=C4+3. Consequently, if C9 is assumed to be a count value at (x1, y0), the count value C1 is indicated as C1=C9+8. The count value C9 at (x1, y0) is set to 0. Thus, C1=8+8=8. Hence, the answer to step S1407 is negative because C(+x) (=0) is not smaller than C(−y) (=8). In step S1408, the previous second flag FA(−y) for the upper contiguous dot at (x1, y8) is equal to 0, and the first flag FB at (x1, y9) is set to 0.

At (x0, y9), the dot matrix coincides with the pattern shown in FIG. 44F, and the above step S1407 "C(+x)≦C(−y)?" is again performed. The previous count value C(+x) for the right-hand contiguous dot at (x1, y9) is equal to 9 (=8+1). The previous count value C(−y) for the upper contiguous dot is a count value at (x1, y8) which is equal to 8. Thus, the answer to step S1407 is affirmative. In step S1409, the previous first flag F(+x) for the right-hand contiguous dot at (x1, y9) is equal to 0, and the first flag FB at (x0, y9) is set to 0. Accordingly, the first flags FB for all the dots on the line y9 are set as shown in FIG. 48.

Figure 49:
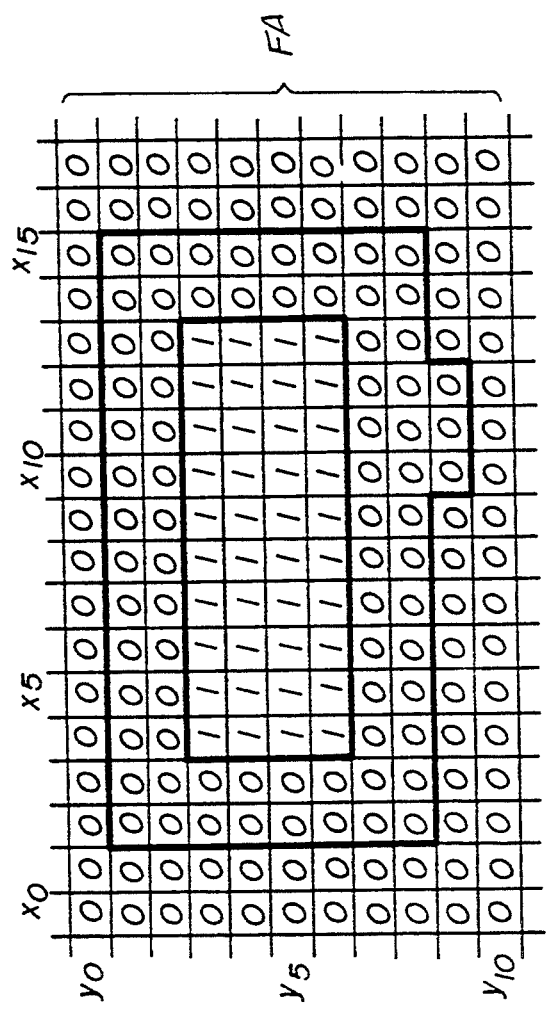

FIG. 49 shows the resulting data of the second flags when the first and second flag setting processes have been performed for dots on lines y0 to y10 of the image data shown in FIG. 42. Herein, the operations of the second flag setting process shown in FIG. 45 in which the second flags FA for dots on the line y9 are being set will be described. For example, at (x2, y9), the dot matrix coincides with the pattern PM26, and step S1504 is performed to set the previous second flag FA for the upper contiguous dot to the second flag FA for the target dot at (x2, y9). The second flag FA at (x2, y9) is equal to 0, and the second flag at (x2, y9) is set to 0. Similarly, the second flags for the remaining dots on the line y9 are set to 0. Accordingly, the second flags for all the dots on the line 9 are as shown in FIG. 49.

As shown in FIG. 49, the second flag FA for a dot is set to 1 when the dot lies in the inside of the closed-loop area, and the second flag FA for another dot is set to 0 when the dot lies on the outside of the closed-loop area. In FIG. 49, occasionally, all the second flags FA for black dots (indicated by the numeral "1") of the image data shown in FIG. 42 are set to 0. Generally, the second flags FA for black dots of the input image data may be set to either 0 or 1.

Figure 50:
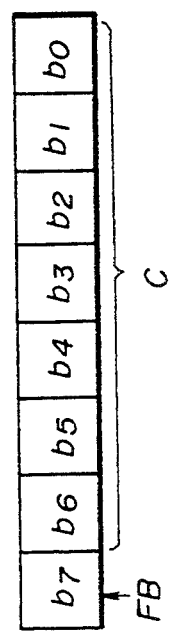
FIG. 50 is a diagram showing a configuration of bits of the first flag and the associated counter used in the sixth embodiment.

FIG. 50 shows a configuration of bits of the first flag FB and the associated count value C used by the sixth embodiment for each dot. The value of the first flag FB is indicated by a bit "b7" in FIG. 50, and the count value C is indicated by seven bits "b6" to "b0". The bit "b6" is the most significant bit (MSB) of the count value C.

Figure 51:
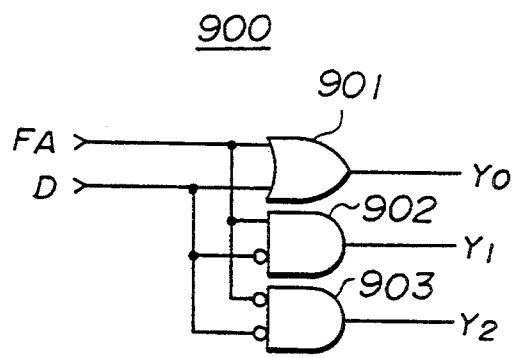
FIG. 51 is a system diagram showing a circuit for outputting a paint signal, and area detection signals from the second flag data and the image data.

FIG. 51 shows a circuit 900 for outputting a paint signal, and area detection signals from the image data and the second flag data generated through the above second flag setting process. The circuit 900 shown in FIG. 51 includes three logic gates 901 to 903. The second flag data FA (the flag data generated based on the result of the above second flag setting process), and the image data D (input to the circuits 100 and 200) are input to the gates 901 to 903. A paint signal Y0 used to paint out the inside of a closed-loop area is supplied from the gate 901 as an output of the circuit 900. An area detection signal Y1 indicating the inside of the closed-loop area and an area detection signal Y2 indicating the outside thereof are supplied from the gates 902 and 903 as the other outputs of the circuit 900.

Figures 52A, 52B:
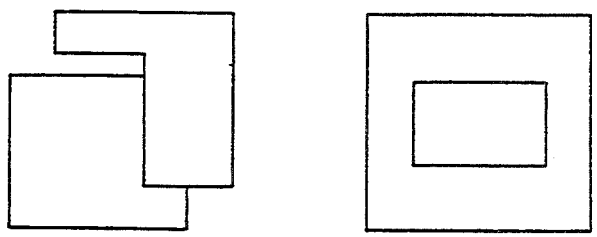
FIGS. 52A through 52D are diagrams for explaining the effects of the closed-loop area detecting method of the present invention performed on some types of closed-loop areas on a document.
Figures 52C, 52D:
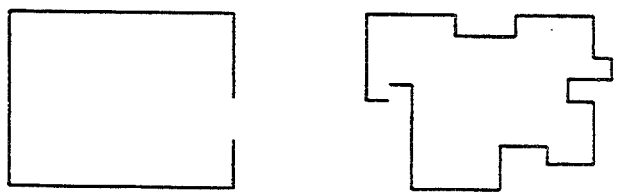

In the above described embodiments, the second flags (or the third flags) for all the dots of input image data are set for each dot, and it is therefore possible to correctly and reliably detect whether a dot of the image data lies in the inside of a closed-loop area or on the outside thereof even when one of types of closed-loop marks shown in FIGS. 52A through 52D is present on a document. FIG. 52A shows an overlapping type mark in which two closed-loop marks overlap. FIG. 52B shows a double closed-loop mark in which one closed-loop mark is enclosed by the other closed-loop mark. FIG. 52C shows an open-loop mark, and FIG. 52D shows a complicated-shape mark with recessed portions and projecting portions. According to the present invention, it is possible to detect a dot of the image data as lying in the inside of any of these marks or on the outside thereof with a reasonable accuracy.

Further, the present invention is not limited to the above described embodiments, and variations and modifications may be made without departing from the scope of the present invention.

What is claimed is:

1. A method for detecting a closed-loop area on a document from bi-level image data read from the document, said bi-level image data made up of a set of two-dimensionally arranged black and white dots, said method comprising steps of:

reading a dot matrix from bi-level image data sequentially for dots on a line in the image data in a first direction opposite to a reading direction, said dot matrix arranged in a first formation and comprising a target dot and two or more contiguous dots contiguous to the target dot;

performing a first pattern matching to detect whether the dot matrix arranged in the first formation coincides with one of a plurality of first patterns, said first pattern matching being performed sequentially for the dots on the line in the first direction;

setting a first flag for the target dot to a first value or a second value based on the result of said first pattern matching so that the first flag for each of the dots on the line is set;

reading a dot matrix from the bi-level image data sequentially for the dots on the line in the reading direction opposite the first direction, said dot matrix arranged in a second formation and comprising a target dot and two or more contiguous dots contiguous to the target dot;

performing a second pattern matching to detect whether said dot matrix arranged in the second formation coincides with one of a plurality of second patterns, said second pattern matching being performed sequentially for the dots on the line in the reading direction;

setting a second flag for the target dot to the first value or the second value based on the result of said second pattern matching and based on the values of the first flags set in said first flag setting step, so that the second flag for each of the dots on the line is set;

repeating the first flag setting step and the second flag setting step so that the second flags for all the dots of the bi-level image data are set; and detecting a dot as lying in the inside of the closed-loop area when the second flag is set to the first value, and detecting a dot lies on the outside of the closed-loop area when the second flag is set to the second value, wherein the second flag for the target dot is set in accordance with the value of the second flag previously set for one of the contiguous dots and in accordance with the image data for the target dot.

2. A method according to claim 1, wherein the dot matrix arranged in the first formation is made up of the target dot, the upper contiguous dot, and the right-hand contiguous dot, and the dot matrix arranged in the second formation is made up of the target dot, the upper contiguous dot, and the left-hand contiguous dot.

3. A method according to claim 1, wherein the dot matrix arranged in the second formation is made up of the target dot, the upper contiguous dot, and the left-hand contiguous dot, and wherein, when the dot matrix coincides with a specific pattern of the second patterns in said second flag setting step, it is detected whether or not a previous second flag previously set for the left-hand contiguous dot is equal to the first flag for the target dot, the value of the second flag for the target dot being determined based on the result of said detection.

4. A method according to claim 1, wherein the dot matrix arranged in the first formation is made up of the target dot, the upper contiguous dot, and the right-hand contiguous dot, and wherein, when the dot matrix coincides with a specific pattern of the first patterns in said first flag setting step, it is detected whether or not a previous first flag previously set for the right-hand contiguous dot is equal to the previous second flag previously set for the upper contiguous dot, the value of the first flag being determined based on the result of said detection.

5. A method according to claim 1, further comprising a step of outputting, after said detecting step is performed, a paint signal and a detection signal in accordance with the second flag value and the image data for each dot.

6. A method according to claim 5, wherein said paint signal is generated as a disjunction of the second flag value and the image data, and said detection signal is generated as a conjunction of the second flag value and the inverted value of the image data.

7. A method according to claim 1, wherein the dot matrix arranged in the first formation is made up of the target dot, the upper contiguous dot, the right-hand contiguous dot, and the upper diagonally-contiguous right-hand dot, and the dot matrix arranged in the second formation is made up of the target dot, the upper contiguous dot, the left-hand contiguous dot, and the upper diagonally-contiguous left-hand dot.

8. A method according to claim 1, wherein a count value indicating the number of successive first flags having the same value arranged in a direction perpendicular to the reading direction is set for each dot in said first flag setting step.

9. A method according to claim 1, wherein the dot matrix arranged in the first formation is made up of the target dot, the upper contiguous dot, the right-hand contiguous dot, and the upper diagonally-contiguous dot, and wherein, when the dot matrix coincides with a specific pattern of the first patterns, it is detected whether or not a previous first flag previously set for the right-hand contiguous dot is equal to a previous second flag previously set for the upper contiguous dot, the value of the first flag for the target dot being determined based on the result of said detection.

10. A method according to claim 8, wherein the dot matrix arranged in the first formation is made up of the target dot, the upper contiguous dot, and the right-hand contiguous dot, and wherein, when the dot matrix coincides with a specific pattern of the first patterns, it is detected whether or not a previous count value previously set for the right-hand contiguous dot is smaller than a previous count value previously set for the upper contiguous dot, the value of the first flag for the target dot being determined based on the result of said detection.

11. A method of detecting a closed-loop area present on a document from bi-level image data read from the document, said image data being made up of a set of two-dimensionally arranged black and white dots, said method comprising steps of:

reading a dot matrix from bi-level image data sequentially for dots on a line in the bi-level image data in a first direction opposite to a reading direction, said dot matrix being arranged in a first formation and comprising a target dot and two or more previously read dots that are contiguous to the target dot;

performing a first pattern matching to detect whether the dot matrix arranged in the first formation coincides with one of a plurality of first patterns, said first pattern matching being performed sequentially for the dots on the line in the first direction;

setting a first flag for the target dot to one of four different values based on the result of the first pattern matching so that the first flag for each of the dots on the line is set;

reading a dot matrix from the bi-level image data sequentially for the dots on the line in the reading direction opposite the first direction, said dot matrix arranged in a second formation and comprising a target dot and two or more contiguous dots contiguous to the target dot;

performing a second pattern matching to detect whether the dot matrix arranged in the second formation coincides with one of a plurality of second patterns, said second pattern matching being performed sequentially for the dots on the line in the reading direction;

setting a second flag for the target dot to one of four different values based on the result of said second pattern matching and based on the values of the first flags set in the first flag setting step, so that the second flag for each of the dots on the line is set;

reading the first flag value and the second flag value for the target dot to set a third flag for the target dot to a first value or a second value in accordance with the first flag value and the second flag value;

repeating the first flag setting step, the second flag setting step and the third flag setting step so that the third flags for all the dots of the bi-level image data are set; and detecting a dot as lying in the inside of a closed-loop area when the third flag is set to the first value, and detecting a dot as lying in the outside of the closed-loop area when the third flag is set to the second value.

12. A method according to claim 11, wherein both the first flag and the second flag for the target dot are expressed by two-bit information, and the third flag for the target dot is expressed by one-bit information.

13. A method according to claim 11, wherein the second flag for the target dot is set in accordance with the value of a previous second flag previously set for one of the contiguous dots and in accordance with the image data for the target dot.

14. An apparatus for detecting a closed-loop area on a document from bi-level image data read from the document and for outputting a detection signal indicating the closed-loop area, said image data made up of a set of two-dimensionally arranged black and white dots, said apparatus comprising:

first reading means for reading a dot matrix from bi-level image data sequentially for dots on a line in the image data in a first direction opposite to a reading direction, said dot matrix arranged in a first formation and comprising a target dot and two or more contiguous dots contiguous to the target dot;

first pattern matching means, coupled to said first reading means, for performing a first pattern matching to detect whether the dot matrix read by said first reading means coincides with one of a plurality of first patterns, said first pattern matching being performed sequentially for the dots on the line in the first direction;

first flag means, coupled to said first pattern matching means, for setting a first flag for the target dot to a first value or a second value based on the result of said first pattern matching so that the first flag for each of the dots on the line is set;

second reading means for reading a dot matrix from the bi-level image data sequentially for the dots on the line in the reading direction opposite to the first direction, said dot matrix arranged in a second formation and comprising a target dot and two or more contiguous dots contiguous to the target dot;

second pattern matching means, coupled to said second reading means, for performing a second pattern matching to detect whether said dot matrix read by said second reading means coincides with one of a plurality of second patterns, said second pattern matching being performed sequentially for the dots on the line in the reading direction;

second flag means, coupled to said second pattern matching means, for setting a second flag for the target dot to the first value or the second value based on the result of said second pattern matching and based on the values of the first flags set by said first flag setting means so that the second flag for each of the on the line is set, and said first flag setting and said second flag setting being repeated so that the second flags for all the dots of the bi-level image data are set; and output means, coupled to said second flag means, for detecting whether a dot lies in the inside of the closed-loop area or on the outside thereof in accordance with the value of the second flag set by said second flag means, and for outputting a detection signal and a paint signal in accordance with the second flag value and the image data for each dot, wherein said second flag means sets the second flag for the target dot in accordance with the value of a previous second flag previously set for one of the contiguous dots and in accordance with the image data for the target dot.

15. An apparatus according to claim 14, wherein the dot matrix arranged in the first formation is made up of the target dot, the upper contiguous dot, and the right-hand contiguous dot, and the dot matrix arranged in the second formation is made up of the target dot, the upper contiguous dot, and the left-hand contiguous dot.

16. An apparatus according to claim 14, wherein said output means includes a logic gate for outputting a disjunction of the second flag value and the image data, and a logic gate for outputting a conjunction of the second flag value and the inverted value of the image data.

* * * * *